(12) United States Patent
Amano

(10) Patent No.: US 8,694,760 B2
(45) Date of Patent: Apr. 8, 2014

(54) BRANCH PREDICTION USING A LEADING VALUE OF A CALL STACK STORING FUNCTION ARGUMENTS

(75) Inventor: Katsushige Amano, Kyoto (JP)

(73) Assignee: Panasonic Corporation, Osaka (JP)

(*) Notice: Subject to any disclaimer, the term of this patent is extended or adjusted under 35 U.S.C. 154(b) by 666 days.

(21) Appl. No.: 13/001,852

(22) PCT Filed: May 19, 2010

(86) PCT No.: PCT/JP2010/003357
§ 371 (c)(1),
(2), (4) Date: Dec. 29, 2010

(87) PCT Pub. No.: WO2010/134330
PCT Pub. Date: Nov. 25, 2010

(65) Prior Publication Data
US 2011/0119472 A1 May 19, 2011

(30) Foreign Application Priority Data
May 19, 2009 (JP) .................................. 2009-120583

(51) Int. Cl.
G06F 9/32 (2006.01)
G06F 9/40 (2006.01)

(52) U.S. Cl.
USPC ............ 712/238; 712/233; 712/242; 717/140

(58) Field of Classification Search
None
See application file for complete search history.

(56) References Cited

U.S. PATENT DOCUMENTS

| 4,763,245 | A  | * | 8/1988 | Emma et al. | 712/240 |
| 5,333,283 | A  | * | 7/1994 | Emma et al. | 712/236 |
| 6,516,409 | B1 | * | 2/2003 | Sato | 712/239 |
| 2003/0131345 | A1 | * | 7/2003 | Wilkerson et al. | 717/156 |
| 2004/0172524 | A1 |   | 9/2004 | Hoogerbrugge | |
| 2007/0088937 | A1 | * | 4/2007 | Archambault et al. | 712/239 |
| 2008/0126770 | A1 | * | 5/2008 | Morrow | 712/233 |
| 2009/0158017 | A1 | * | 6/2009 | Mutlu et al. | 712/240 |

FOREIGN PATENT DOCUMENTS

JP 2004-533695 11/2004

OTHER PUBLICATIONS

Wikipedia (Call Stack—Apr. 6, 2008 revision); accessed on Aug. 16, 2013; 6 pages; accessible at: http://en.wikipedia.org/w/index.php?title=Call_stack&oldid=203829677.*
Farooq et al. (Value Based BTB Indexing for Indirect Jump Prediction); High Performance Computer Architecture (HPCA), 2010 IEEE 16th International Symposium on; Jan. 9-14, 2010; 11 pages.*

(Continued)

Primary Examiner — Keith Vicary
(74) Attorney, Agent, or Firm — Wenderoth, Lind & Ponack, L.L.P.

(57) ABSTRACT

A branch prediction mechanism within an information processing device comprises a call stack where function arguments are stacked when function calls are performed. The call stack stores arguments relating to branch instructions within the function. The branch prediction mechanism stores the branch instruction address, the leading value of the call stack, and the branch destination address at branch instruction execution time, which are in correspondence, in a branch result buffer. A branch prediction unit obtains the branch instruction address and leading value of the call stack when notified of branch instruction execution, searches the branch result buffer for a branch destination corresponding to the address and leading value, and predicts the search result as the branch destination of the executed branch instruction. An instruction fetch unit fetches instructions from the branch destination predicted by the branch prediction unit.

9 Claims, 17 Drawing Sheets

(56) References Cited

OTHER PUBLICATIONS

Farooq et al. (Compiler Support for Value-based Indirect Branch Prediction); CC'12 Proceedings of the 21st international conference on Compiler Construction; pp. 185-199; 2012.*

Heil et al. (Improving Branch Predictors by Correlating on Data Values); Micro 32 Proceedings of the 32nd annual ACM/IEEE international symposium on Microarchitecture; pp. 28-37; 1999.*

International Search Report issued Jun. 22, 2010 in International (PCT) Application No. PCT/JP2010/003357.

Takashi Toyoshima et al., "Register Indirect Jump Target Forwarding", Symposium on Advanced Computing Systems and Infrastructures SACSIS2006 Ronbunshu, vol. 2006, No. 5, ISSN: 1344-0640, May 22, 2006.

Amir Roth et al., "Improving Virtual Function Call Target Prediction via Dependence-Based Pre-Computation", Proceedings of the 13$^{th}$ International Conference on Supercomputing, ACM, pp. 356-364, ISBN:1-58113-164x, 1999.

* cited by examiner

FIG. 3

| Branch instruction address /301 | Leading value of call stack /302 | Branch destination /303 |
|---|---|---|
| 0x0100 | A | 0x1000 |
| 0x0100 | B | 0x2000 |
| 0x0210 | A1 | 0x1500 |
| 0x0210 | A2 | 0x1700 |
| 0x0210 | A3 | 0x1900 |
| ⋮ | ⋮ | ⋮ |

FIG. 17A

Call stack                                    113

| c0 | c1 | c2 |
|----|----|----|
| b0 | b1 | b2 |
| a0 | a1 | a2 |

FIG. 17B

Call stack                                    113

| c0 | address C |
|----|-----------|
| b0 | address B |
| a0 | address A |

BRANCH PREDICTION USING A LEADING VALUE OF A CALL STACK STORING FUNCTION ARGUMENTS

TECHNICAL FIELD

The present invention relates to branch prediction for instructions executed by an information processing device.

BACKGROUND ART

Processor instructions sometimes include branch instructions, which branch to an indicated address. In current processors, instructions are executed using a pipeline structure.

Instruction execution in a pipeline proceeds by fetching the next instruction to be executed from a later address before the execution of a given instruction is complete. On occasion, the flow of a program will change due to execution of a branch instruction, rendering the fetched instruction unnecessary. For this reason, a new instruction must be fetched from the branch destination address to replace the now-unnecessary instruction.

Restarting the fetching of instructions in this way causes instruction processing that has already made progress down the pipeline to be aborted (what is known as a pipeline hazard), which is one cause of performance degradation in processors.

Hence branch destination prediction for branch instructions is critical to processors.

One type of branch prediction is conditional branch instruction. A conditional branch instruction involves determining whether or not branching will ensue from a branch instruction according to calculation results made at that time. Should branching not ensue, the succeeding instructions are executed. When branching does ensue, an instruction indicated by a fixed branch destination address is executed.

There is technology relating to conditional branch instructions for determining the branch destination by guessing whether or not branching will ensue according to past branch results. That is, statistics on whether or not branching occurred are collected from past branch results and the most probable branch destination is predicted accordingly. The reliability of branch prediction using conditional branch instruction can be improved accordingly.

However, there also exists a more complex form of branching known as indirect branching. Indirect branching involves cases in which the branch destination is not fixed, such as cases featuring instructions to branch to a value set by a given register, to branch according to address substitution in a program counter, and the like.

With indirect branching, not only is the occurrence of conditional branching uncertain, but the branch destination itself is not fixed, either. Therefore, the branch destination cannot be predicted through simple branch prediction functions.

One conventional technology for indirect branching prediction is the return stack. The return address after function execution varies according to function call origin, and so the function call origin address is recorded in a stack or similar structure in memory in order to be branched when returning from the function. This return address is saved in an exclusive return stack at function call time so that, when an instruction is fetched to return from the function, before branching by obtaining a return address from memory is processed, the return address from the return stack is obtained for use in predicting the address to be fetched next.

Also, one indirect branching-related technology for branch prediction involves predicting the branch destination by the programmer designating key information that contributes to indirect branching results and using single-purpose implicit operation instructions within the program (see Patent Literature 1).

CITATION LIST

Patent Literature

[Patent Literature 1]
Japanese Patent Application Publication No. 2004-533695

SUMMARY OF INVENTION

Technical Problem

However, the technology described in the above-cited Patent Literature 1 requires the use of single-purpose implicit operation instructions to notify the processor of key information, and thus time and effort must be expended in order to include such implicit operation instructions within the program intended for prediction.

The present invention has been achieved in view of reducing the above expenditure of time and effort, and an aim thereof is to provide a branch prediction device that predicts branching in any given program that includes indirect branching, and to do so without need for single-purpose processing within that program, such as the implicit operation instructions described above.

Solution to Problem

In order to solve the above problems, the branch prediction device pertaining to the present invention comprises an instruction execution unit operable to execute instructions, a function call notification unit operable to make a notification of execution of a function call instruction by the instruction execution unit, a call stack that stores therein at least one argument of the function call instruction when notified by the function call notification unit of the execution of the function call instruction, a branch instruction notification unit operable to make a notification of execution of a branch instruction by the instruction execution unit, the branch instruction being included in the function that is called by the function call instruction, a branch result buffer that stores therein branch result entries each showing the following (i), (ii), and (iii) in correspondence: (i) a branch instruction address; (ii) a leading value of the call stack at branch instruction execution time; and (iii) a branch result indicating an address of a branch destination, a branch prediction unit operable to (i) when notified by the branch instruction notification unit of the execution of the branch instruction, search the branch result buffer for any branch result entry therein that matches a branch instruction address of the executed branch instruction and an argument stored in the call stack when the branch instruction is executed, and (ii) if a branch result entry that matches is found, regard a branch result of the branch result entry that matches as a predicted result of branching by the branch instruction, an instruction fetch unit operable to fetch instructions in accordance with the predicted result predicted by the branch prediction unit, and a branch result record unit operable to, after the execution of the branch instruction is complete, record in the branch result buffer one branch result entry showing the following (i), (ii), and (iii) in correspondence: (i) the branch instruction address of the executed branch instruction; (ii) a branch result indicating an address of a branch destination that has been branched to via the execution of the branch instruction; and (iii) a leading value of the call stack at execution time of the branch instruction.

Advantageous Effects of Invention

Here, a function represents a subroutine within a computer program.

According to the above structure, the branch prediction device is able to predict branching when a function call is executed through arguments of the function obtained by the call stack and by using arguments within the call stack as well as past branch results if a branch instruction is executed. Thus, branch prediction can be realized by the branch prediction device for indirect branching in any given program without requiring the user to employ special instructions such as the implicit operation instructions described in the above-cited Patent Literature 1, as the device automatically obtains arguments of the function relating to a branch instruction for use as key information in branch prediction.

BRIEF DESCRIPTION OF DRAWINGS

FIG. 3 shows a data schematic for an example structure of the branch result information that is stored in the branch result buffer.

FIGS. 17A and 17B show another example structure of the call stack.

DESCRIPTION OF EMBODIMENT (Embodiment)

A preferred Embodiment of the branch prediction device pertaining to the present invention, which is an information processing device 100 including a branch prediction device 1000 within, is described below with reference to the drawings.

(Structure)

Figure 1:
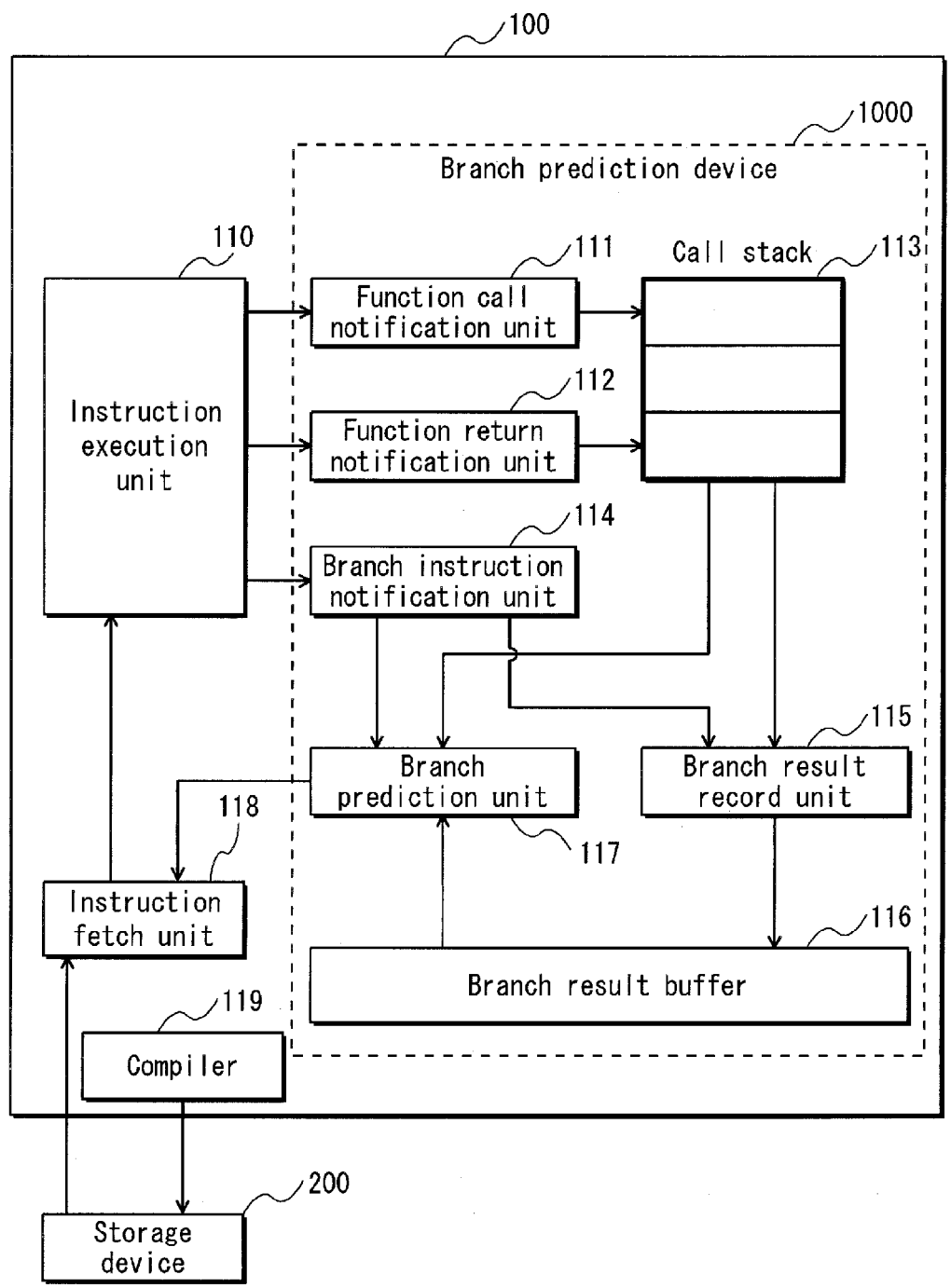
FIG. 1 shows a functional block diagram of the functional structure of the branch prediction device pertaining to the Embodiment.

FIG. 1 is a functional block diagram showing the functional structure of the information processing device 100. As shown in FIG. 1, the information processing device 100 includes an instruction execution unit 110, a function call notification unit 111, a function return notification unit 112, a call stack 113, a branch instruction notification unit 114, a branch result record unit 115, a branch result buffer 116, a branch prediction unit 117, an instruction fetch unit 118, and a compiler 119.

The information processing device 100 is a processor that is connected to a storage device 200 and that consecutively reads and executes instructions stored in the storage device 200.

The instruction execution unit 110 sequentially executes a sequence of instructions fetched from the storage device 200 that were converted into executable format by the compiler 119.

The function call notification unit 111 detects function calls performed by the instruction execution unit 110 and notifies the call stack 113 to such effect. Here, a function call is a subroutine call, one that calls a routine for executing one or more instructions. High-level language functions are a sequence of processor instructions that are compiled by the compiler 119 into machine code, which is then executed. When the compiler 119 uses a specific instruction in compiling a function call, the function call notification unit 111 detects the execution of that specific instruction and thus detects the execution of a function call. That specific instruction may be, for example, an instruction to store the next address after the address of the branch instruction as a return address in a specific register, known as the return register, while branching. Functions are compiled according to the compile code used by the information processing device 100. The function call detection unit 111 assumes that the sequence of instructions will be compiled according to that code and, with the details of the specific instruction stored, detects the execution of the predetermined specific instruction and thus makes a notification to the effect that a function call has been performed.

The function return notification unit 112 watches for functions completed by the instruction execution unit 110, i.e. for the execution of return instructions, and once a return occurs, notifies the call stack 113 to such effect. Much like function calls, function returns are also compiled by the compiler 119 using a specific instruction. The execution of this specific instruction by the compiler 119 is detected by the function return notification unit 112 and thus function returns are detected.

The call stack 113 obtains a value stored in a specific register in the instruction execution unit 110 that is pushed onto the stack, i.e. stored therein, as an argument of a called function when notified of a function call by the function call notification unit 111. Also, the call stack 113 outputs, i.e.

pops, the last-stored argument when notified by the function return notification unit 112 that a function has finished, i.e. that there has been a return. It should be noted that the call stack 113 is what is known as a FILO (First In Last Out) memory. In the present description, when the call stack 113 is made to pop a held argument, the value so output is the leading value written therein. Through the pushing and popping described above, the call stack 113 is made to always store an argument for the function currently being executed as the leading value.

Figure 2:
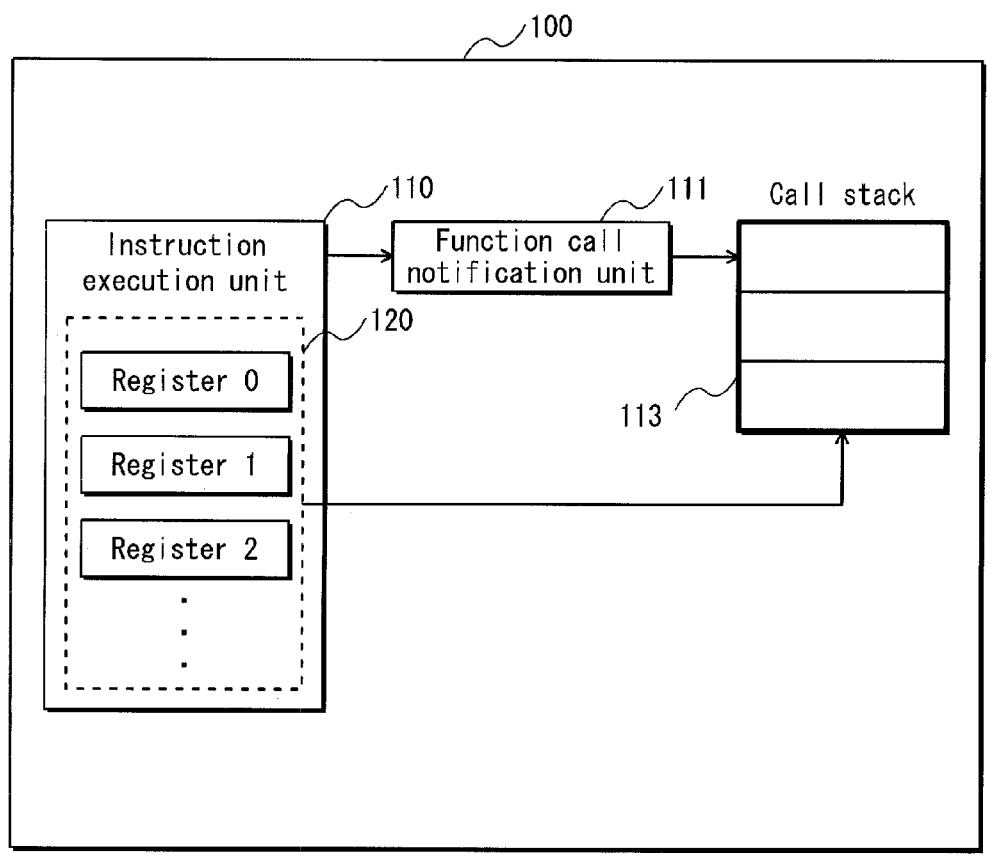
FIG. 2 shows a schematic diagram of argument passing to the call stack 113.

FIG. 2 shows the processing by the call stack 113, i.e. the details of how arguments are obtained.

Function arguments are passed in a pre-determined manner. Ordinarily, in high-level language programs, function arguments are stored in the order in which they are written, allocated to each of several registers in a group of registers 120 within the instruction execution unit 110 in ascending order starting from the lowest-numbered register. That is, arguments are stored in registers so that a first function argument is stored in register 0, a second function argument is stored in register 1, a third function argument is stored in register 2, and so on. Thus, in the present embodiment, as shown in FIG. 2, the call stack 113 obtains and stores the argument that is stored in register 0 out of all the arguments stored in registers.

Figure 4:
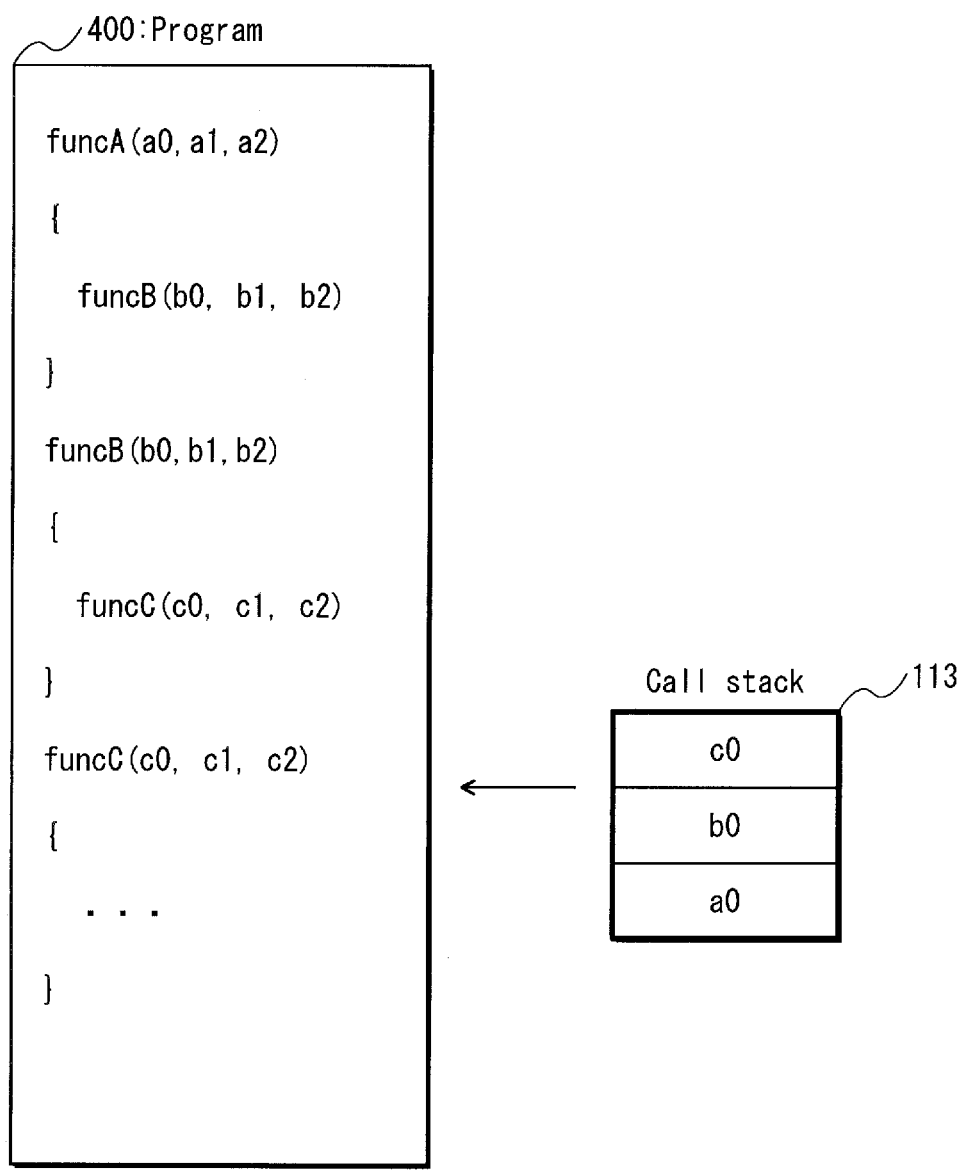
FIG. 4 shows a schematic diagram of arguments being stored in the call stack during program execution.

Additionally, FIG. 4 shows a specific example of argument storage order in the call stack 113.

The program 400 has a function "funcA" that takes the arguments "a0", "a1", and "a2". The argument "a0" is stored in register 0 and is pushed onto the call stack 113. The program 400 then calls the function "funcB" from within the function "funcA". The function "funcB" takes the arguments "b0", "b1", and "b2". The argument "b0" is stored in register 0 and is pushed onto the call stack 113. The program 400 calls the function "funcC" from within the function "funcB". The function "funcC" takes the arguments "c0", "c1", and "c2". The argument "c0" is stored in register 0 and is pushed onto the call stack 113. In FIG. 4, the information on the arguments held in the call stack 113 at this time is shown to the right-hand side of the program 400. As FIG. 4 makes clear, the leading value is "c0", the first argument of the last-called function "funcC". It should be noted that in FIG. 4, the leading value of the call stack 113 is drawn at the top.

Returning to FIG. 1, the branch instruction notification unit 114 judges whether the instructions executed by the instruction execution unit 110 contain a branch instruction and, when an affirmative judgment is made, notifies the branch result record unit 115 and the branch prediction unit 117 to such effect.

The branch result record unit 115, upon being notified of branch instruction execution by the branch instruction notification unit 114, obtains the address of the branch instruction executed by the instruction execution unit 110 as well as the branch destination address reached as the result of branch instruction execution by the instruction execution unit 110. Also, the branch result record unit 115 obtains the leading value of the call stack 113 at branch instruction execution time. Next, the branch result record unit 115 records the obtained branch instruction address, the leading value of the call stack 113 at branch time, and the branch destination address of the branch instruction, which are in correspondence, in the branch result buffer 116.

The branch result buffer 116 is a memory for storing a branch result entry, which shows the branch instruction address, the leading value of the call stack at branch instruction execution time, and the branch destination address of the branch instruction, in correspondence.

FIG. 3 is a data schematic showing an example of the data structure of the branch result information stored in the branch result buffer 116.

Branch result information is information uniting branch result entries, each of which shows a branch instruction address 301, a call stack leading value 302, and a branch destination 303, in correspondence.

The branch instruction address 301 is a piece of information indicating the address of a branch instruction.

The call stack leading value 302 is a piece of information indicating the argument stored in the call stack 113 at the time when the corresponding branch instruction was executed.

The branch destination 303 is a piece of information indicating the address of a branch destination reached when the branch instruction is actually executed.

The branch result information is stored in the branch result buffer 116 and thus the branch prediction unit 117 is able to execute branch prediction.

Returning to FIG. 1, upon receiving a notification from the branch instruction notification unit 114, the branch prediction unit 117 obtains the branch instruction address transmitted with the notification as well as the leading value of the call stack 113 at that time. The branch prediction unit 117 searches the branch result buffer 116 for a branch result entry that matches both the obtained branch instruction address and the leading value of the call stack 113. Next, if a matching branch result entry is found, the branch prediction unit 117 notifies the instruction fetch unit 118 of the branch destination of that branch result entry as a predicted destination for the branch instruction.

Figure 5:
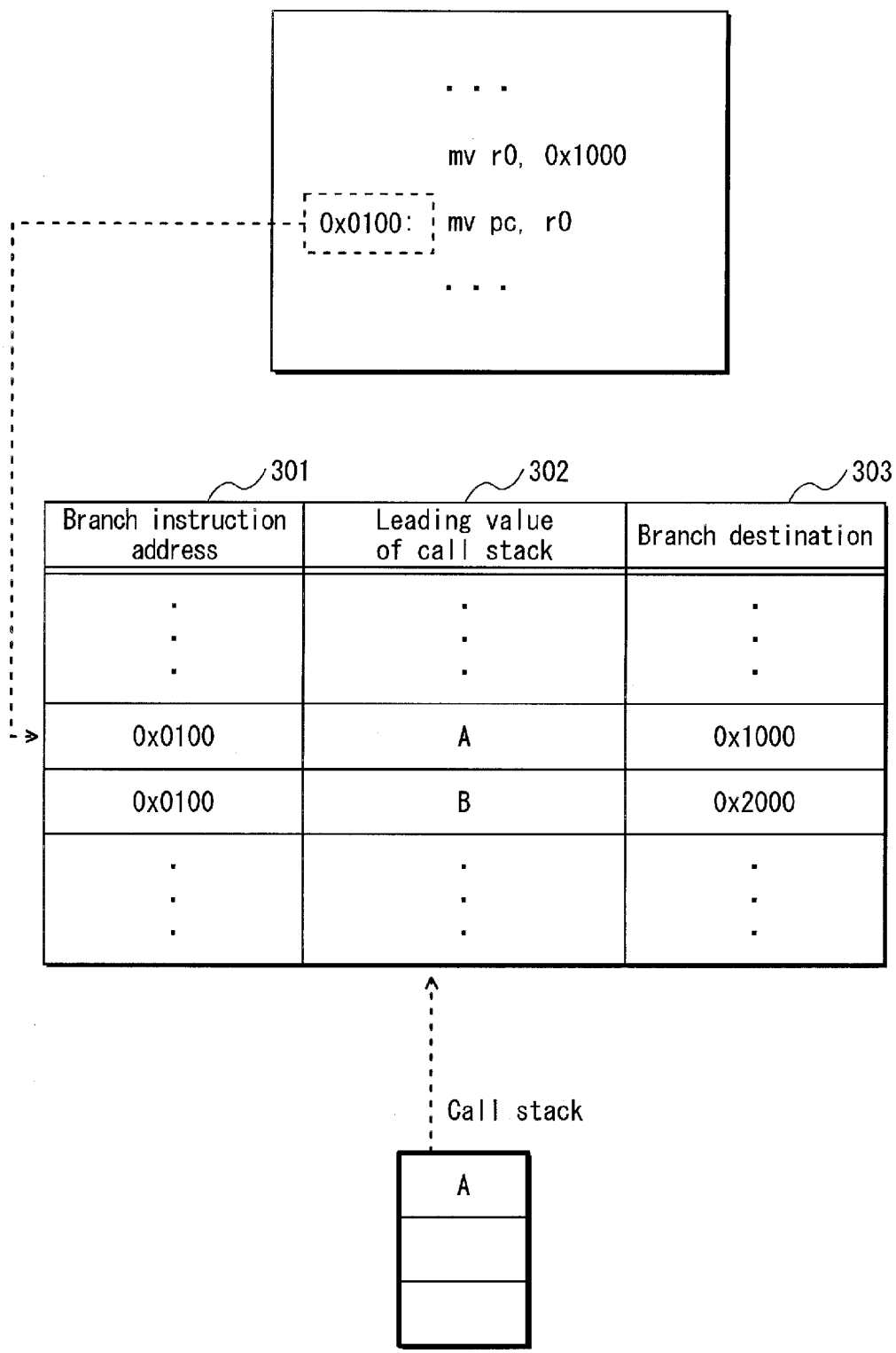
FIG. 5 shows a schematic diagram of searching as executed by the branch prediction unit 117 at branch prediction time.

FIG. 5 is a schematic showing the manner in which the branch prediction unit 117 searches the branch result buffer.

As shown in FIG. 5, the branch prediction unit 117 searches the branch result buffer 116 for a branch result entry corresponding to the branch instruction address and to the argument obtained from the call stack 113 at that time. In other words, the branch prediction unit 117 obtains the address of the branch instruction to be executed and searches for an address matching the obtained branch instruction address.

Next, if branch result entries matching the branch instruction address are found, the branch prediction unit 117 then searches among these branch result entries for a call stack leading value 302 matching the argument obtained from the call stack 113.

Thus, the branch destination of a branch result entry matching in both respects is predicted to be the branch destination of the branch instruction.

Returning once again to FIG. 1, the instruction fetch unit 118 fetches instructions from the storage device 200. When notified by the branch prediction unit 117 of the address of the next instruction to be executed, the instruction fetch unit 118 fetches an instruction from this address.

This concludes the explanation of the functional parts of the information processing device 100.

(Operation)

Figure 6:
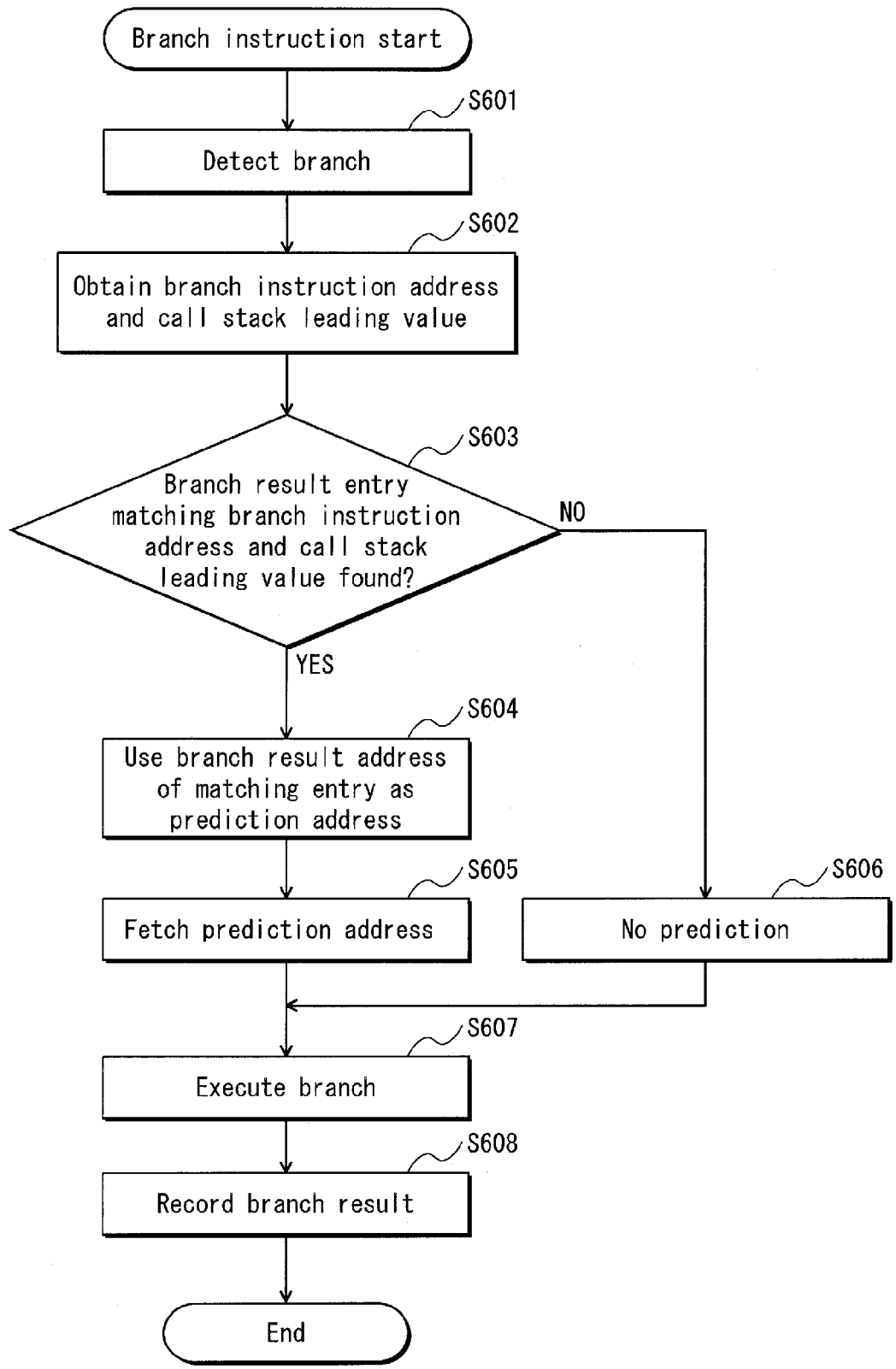
FIG. 6 shows a flowchart of the operation of branch prediction in the information processing device 100.

FIG. 6 is a flowchart showing the operation of branch prediction for the information processing device 100. The operation of branch prediction in the information processing device 100 is explained according to this flowchart.

As shown in FIG. 6, the branch instruction notification unit 114 of the information processing device 100 detects branch instruction execution and notifies the branch prediction unit 117 to such effect (step S601).

The branch prediction unit 117 obtains the leading value of the call stack 113 upon being notified of branch instruction execution by the branch instruction notification unit 114.

Also, the branch prediction unit 117 obtains the address of the executed branch instruction from the branch instruction notification unit 114 (step S602).

Next, the branch prediction unit 117 searches the branch result buffer 116 for a branch result entry matching the obtained branch instruction address and leading value of the call stack 113 (step S603).

If such a branch result entry is found in the branch result buffer 116 (YES in step S603), then the branch prediction unit 117 takes the branch destination 303 of the branch result entry that matches both the address of the executed branch instruction and the leading value of the call stack 113 to predict that branch destination for the branch instruction (step S604).

The instruction fetch unit 118 calls the instruction at the address of which it has been notified by the branch prediction unit 117 from the storage device 200 and fetches that instruction for the instruction execution unit 110 (step S605).

If no branch result entry is found in the branch result buffer 116 (NO in step S603), then the branch prediction unit 117 outputs information indicating no prediction to the instruction fetch unit 118. Then, the instruction fetch unit 118 fetches the next instruction from the address that follows the branch instruction.

Next, the branch instruction is actually executed (step S607). The branch result record unit 115 records in the branch result buffer 116 a branch result entry showing the branch instruction address, the leading value of the call stack 113 at branch instruction execution time, and the address of the branch destination that is the result of branch instruction execution, in correspondence (step S608).

The above describes branch prediction by the branch prediction unit 117 together with the operation of the information processing device 100 at branch instruction execution time.

Figure 7:
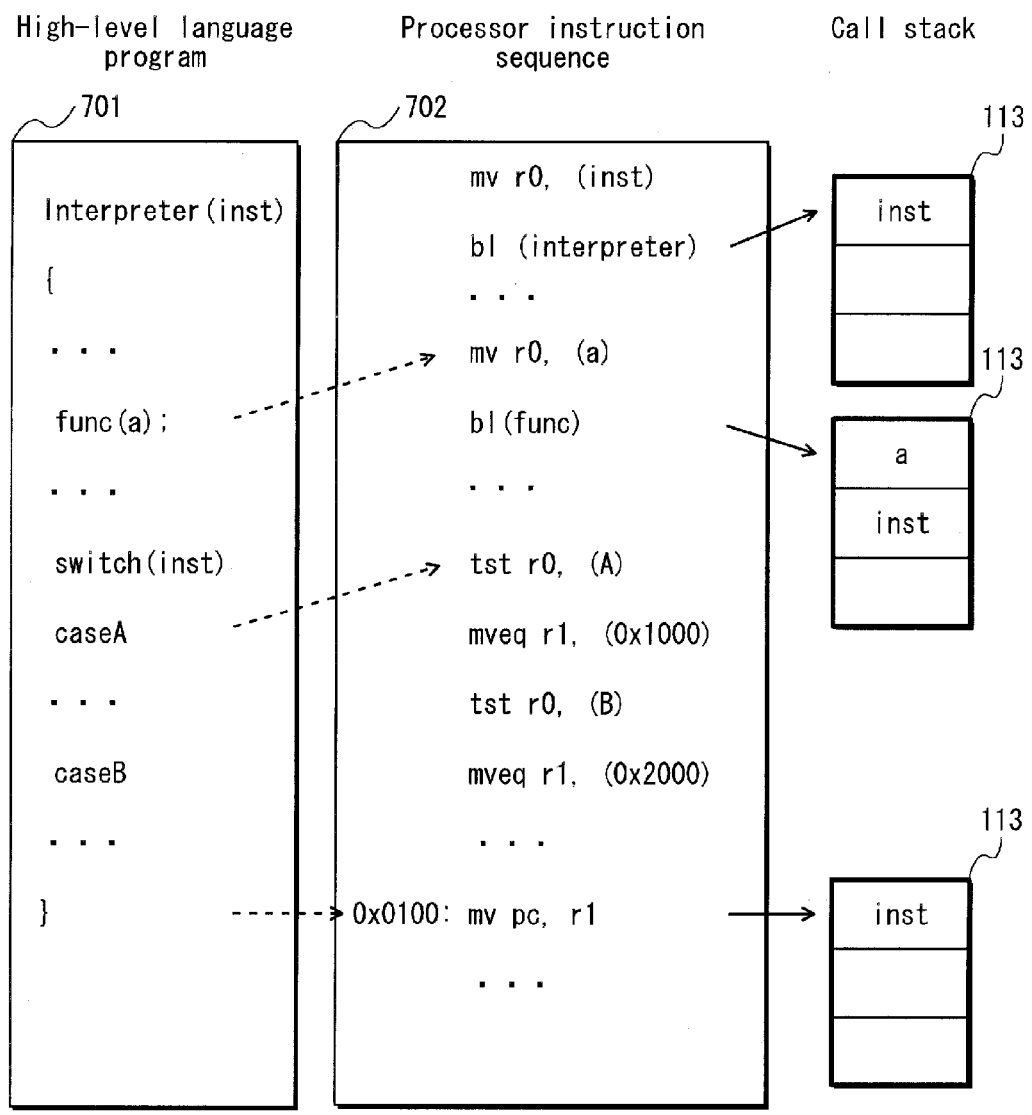
FIG. 7 shows the relationship between the high-level language program, the assembly code of the high-level language program, and the arguments stored in the call stack.

FIG. 7 shows a high-level language program, a compiled sequence of processor instructions, and the arguments stored in the call stack according to the execution of the compiled sequence of instructions.

In FIG. 7, the function "interpreter" of the high-level language program 701 is an interpretive language execution function that takes the pseudo-instruction "inst" as an argument. In JavaScript™ and similar languages, a text file program is first compiled into pseudo-instructions, and then the pseudo-instructions are processed by an interpreter. Ideally, in the function that implements the interpreter, each of the pseudo-language statements is realized by switch/case statements as shown in FIG. 7

The processor instruction sequence 702 shown in FIG. 7 is a sequence of pseudo processor instructions that represents the function "interpreter". In this example, after the "mv" instruction has stored the argument "inst" in the register r0, a branch (function call) to the start of the function "interpreter" is performed with the "b1" instruction.

Firstly, the function "func" is called as a subordinate function within the function "interpreter", with the argument "a" as its argument.

Subsequently, whether the value of the register r0, i.e. the argument of the function "interpreter", is "A" or not is tested with the instruction "tst". If equal to "A", then the value "0x1000" is stored in the register r1. Similarly, if r0 is equal to "B" then the value "0x2000" is stored in the register r1. The value in the register r1 is substituted for the program counter ("pc") in the instruction "mv" at the address "0x0100", and thus branching occurs. In other words, the branch goes to "0x1000" if the argument "inst" of the function "interpreter" is "A", and goes to "0x2000" if that argument is "B".

The right-most column of FIG. 7 shows the state of the call stack 113 as the processor instruction sequence 702 undergoes processing.

When the function "interpreter" is called, the argument "inst" is pushed onto the call stack 113. Afterward, when the subordinate function "func" is called, the argument "a" of the subordinate function "func" is pushed onto the call stack 113. At this point, the argument "a" becomes the call stack leading value.

Next, at function "func" return time, the argument "a" is popped from the stack and the argument "inst" once again becomes the leading value of the call stack 113. When branching occurs at the address "0x0100", a branch result entry with the branch destination address "0x1000" is created in the branch result buffer 116 if the argument "inst" is "A". If the argument "inst" is "B", then a branch result entry with the branch destination address "0x2000" is created in the branch result buffer 116.

This branch result entry makes possible the prediction of either branch destination address whenever the branch instruction at the address "0x0100" is executed later by the function "interpreter" with either argument "A" or "B".

Figure 8:
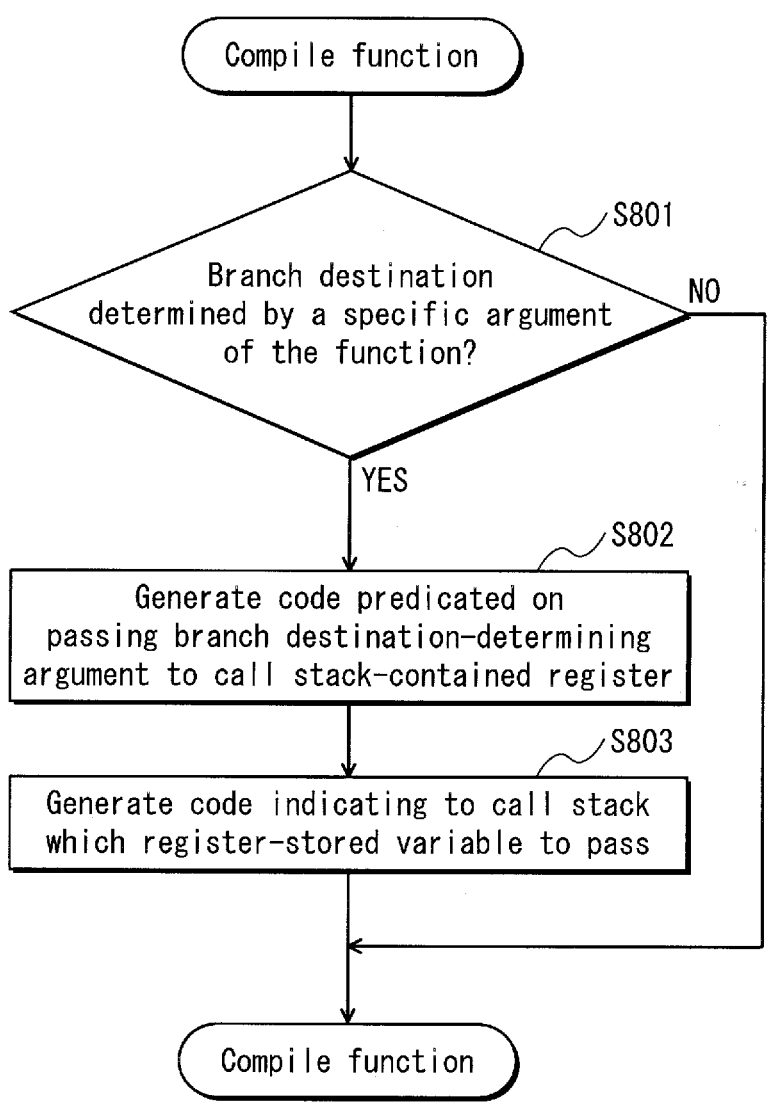
FIG. 8 shows a flowchart of the compiling operation by the compiler 119.

FIG. 8 is a flowchart showing the compile operation by the compiler 119. In particular, FIG. 8 shows the compile operation of a function at function call time. It should be noted that this chart describes only the operation of the parts pertaining to the present embodiment of the invention and that other details of operation conforming to conventional compiler technology are here omitted.

At function compile time, the compiler 119 judges whether or not the branch destination is determined by a specific argument within the function (step S801).

This judgment proceeds as follows. First, the function is analyzed and searched for a branch instruction within. Next, if a branch instruction is found, the compiler 119 judges whether data useable as branch conditions for that branch instruction are included in the arguments of the function. Accordingly, the compiler 119 judges whether or not arguments of the function determine the branch destination.

If a specific argument among the arguments of the function is judged as determining the branch destination (YES in step S801), then code is generated that stores the argument determining the branch destination in the register for which call stack 113 obtains a value (step S802). In other words, code is generated that stores the specific argument among the arguments of the function in register 0. For example, if the argument determining the branch destination is the first argument of the function, then the first argument is stored in register 0. If the argument determining the branch destination is the third argument of the function, then code is generated so that the third argument is stored in register 0.

Next, the compiler 119 generates code that indicates the register from which the call stack 113 is to obtain the argument (step S803). In this example, the compiler 119 generates code so that the call stack 113 obtains the value in register 0.

Next, the compiler 119 compiles each of the instructions within the function as normal and completes the process.

If no specific argument determines the branch destination (NO in step 801), then the compiler 119 compiles each of the instructions within the function as normal and completes the process.

Figure 9:
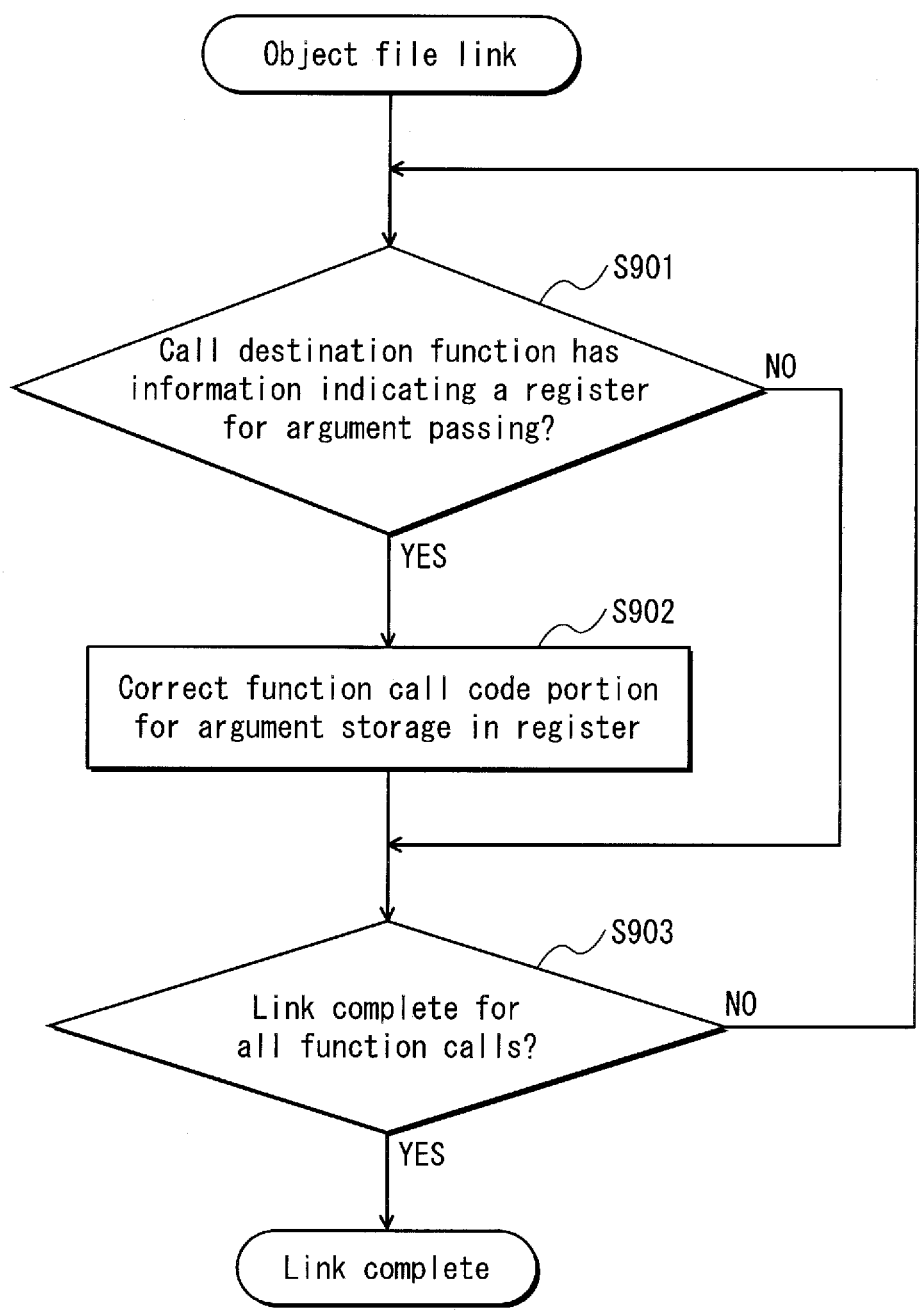
FIG. 9 shows a flowchart of the operation of the instruction execution unit 110 when executing instructions compiled by the compiler 119.

FIG. 9 is a flowchart showing the link operation of an object file in a sequence of code compiled according to the operation shown in FIG. 8. This operation shows how values are stored into a register at instruction execution time. Other operational aspects conforming to conventional instruction execution are here omitted.

As shown in FIG. 9, the instruction execution unit 110 judges whether or not the function to be called holds information indicating the argument passing register (step S901).

If information indicating the argument passing register is held (YES in step S901), then the compiler 119 corrects the code for storing arguments in a register of the function call portion accordingly (step S902). In other words, if there is code that indicates which arguments to store in which register, such code is corrected so that indicated arguments are stored in register 0. If no such indication exists, then the arguments of the function are stored in the order described by the high-level language program, starting with the lowest-numbered register.

Whether or not all function call links are complete is then judged (step S903). If all function call links are judged as complete (YES in step S903), then the object file link process is completed. If not (NO in step S903), the process returns to step S901.

Figure 10A:
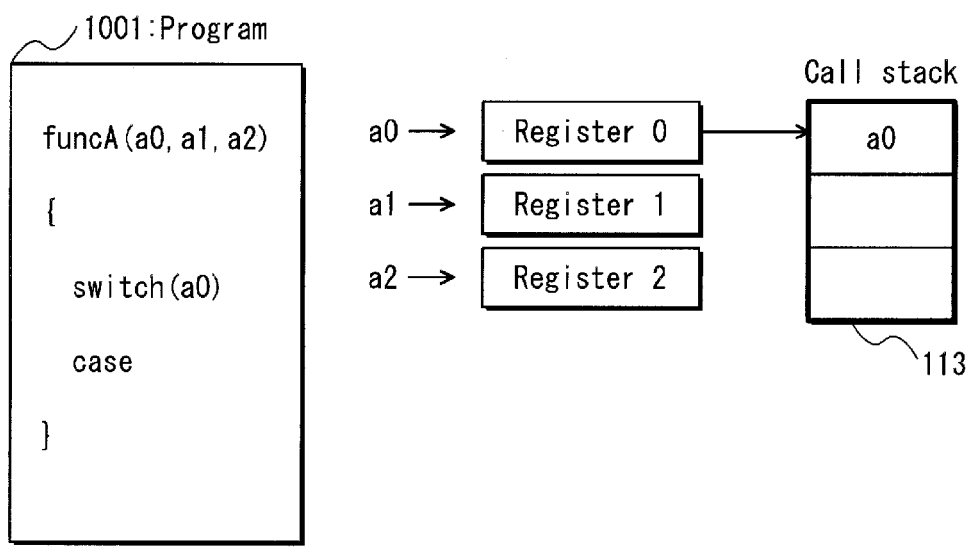
FIGS. 10A and 10B show the relationship between the arguments of a function, the branch instruction argument, and the argument stored in the call stack.
Figure 10B:
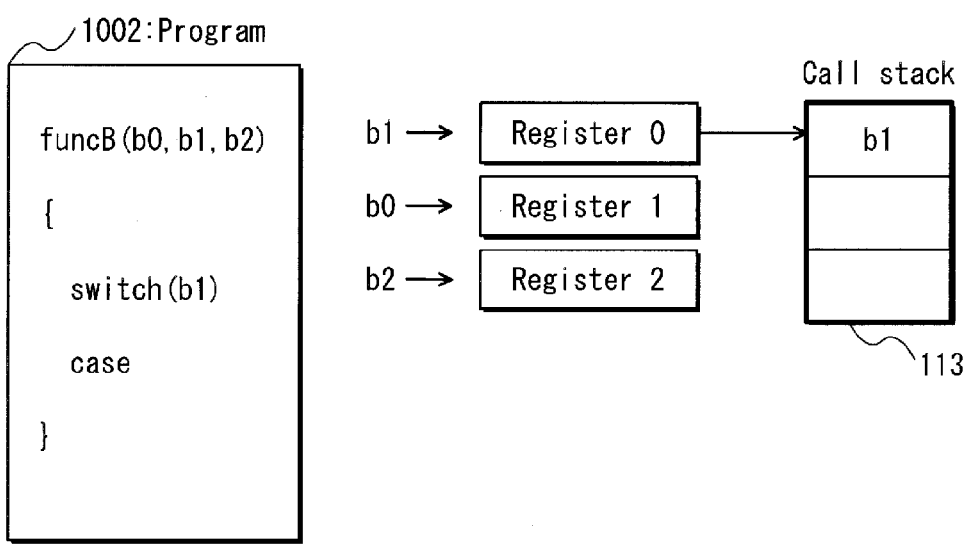

An example in which a function call is executed that executes a branch instruction according to the present compile method is explained below using FIGS. 10A and 10B. FIGS. 10A and 10B show specific examples of a function call where a branch instruction is executed within the function. In these branch instruction examples, switch/case statements are shown. These statements may be, for example, written in C, C++, or PHP (Hypertext Preprocessor; while PHP stands for Personal Home Page tools, the proper name of PHP is "PHP: Hypertext Preprocessor") or another similar language. In the present Embodiment, the information processing device 100 requires the call stack 113 to store an argument of the function that influences branching in order for prediction by the branch prediction unit 117 to succeed. FIGS. 10A and 10B show the manner in which such arguments are stored in registers to achieve the above purpose.

In FIG. 10A, a program 1001 has a "switch" statement in which the argument of influence is the argument "a0". Thus, the argument associated with the branch is "a0" as well. Then, when the function "funcA" is called, the argument "a0" must be passed to the call stack 113. For this reason, the structure is such that the first argument "a0" of "funcA" is stored in register 0. In such a case, the code generated by the compiler 119 is, for instance, an instruction to store the first argument in register 0. This is realized as, for example, "my r0 (a0)". As described above, the argument passed to the call stack 113 is the value stored in register 0, and thus the argument associated with branching is stored in the call stack 113.

In FIG. 10B, the program 1002 has a "switch" statement with an associated argument "b1". The argument "b1" is the second argument of the function "funcB". Thus, the structure is such that the second argument "b1" of "funcB" is stored in register 0. Accordingly, the argument associated with branching is stored in the call stack 113. The structure according to which the second argument is so stored is realized by the compiler 119, which indicates the argument and the register at compile time.

(Variation)

The information processing device 300, which is a structural variation of the information processing device 100 described above, is explained below. In the present variation, only points of difference from the above-described information processing device 100 of the Embodiment are explained, and points of commonality with the information processing device 100 are omitted.

Figure 11:
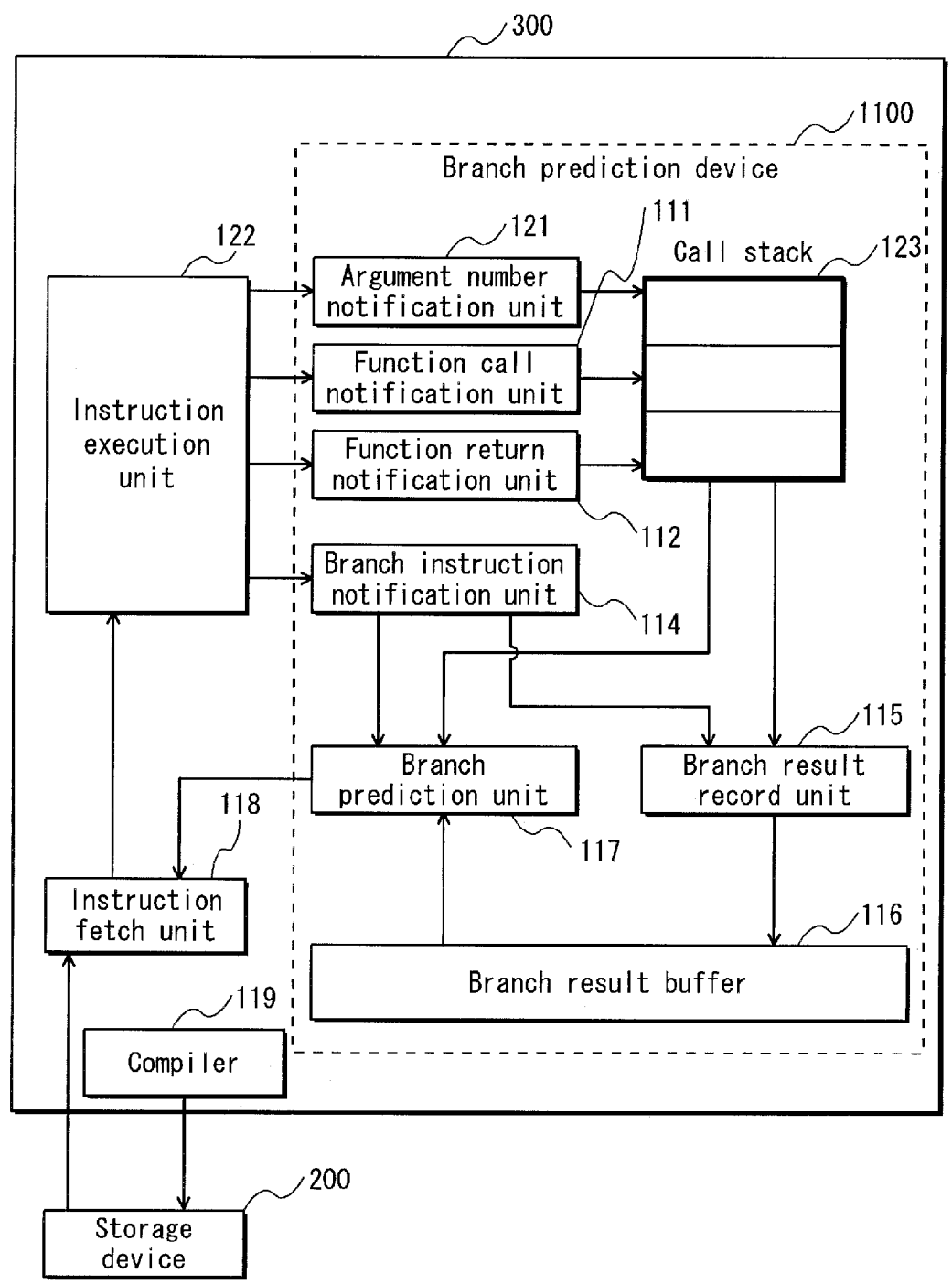
FIG. 11 shows a function block diagram of the functional structure of the information processing device 300 pertaining to a variation of the Embodiment.

FIG. 11 is a functional block diagram showing the functional structure of the information processing device 300.

Unlike the information processing device 100, the information processing device 300 comprises an instruction execution unit 122, the operation of which is in part different from that of the instruction execution unit 110, and an argument number notification unit 121 lacked by the information processing device 100. The structure of the information processing unit 300 is otherwise identical to that of the information processing device 100.

The instruction execution unit 122 executes instructions fetched from the storage device 200 by the instruction fetch unit 118. Furthermore, the instruction execution unit 122 executes instructions that indicate a branch-influencing argument of a function and notifies the argument number notification unit 121 thereof. Instructions indicating such an argument are automatically added at compile time as the compiler analyzes the program.

The argument number notification unit 121 obtains the number of the indicated argument from the instruction execution unit 122 and notifies the call stack 123 thereof.

The call stack 123 pushes the indicated argument upon receiving notification from the argument number notification unit 113. Much like the call stack 113, the call stack 123 pushes arguments of a function upon receiving notification from the function call notification unit 111, and also pops arguments of that function upon receiving notification from the function return notification unit 112. In short, the call stack 123 maintains a leading value that is an argument of the currently-executing function.

According to this structure, the branch prediction mechanism 1100 of the information processing device 100 is able to store branch-influencing arguments in the call stack more reliably.

Figure 12A:
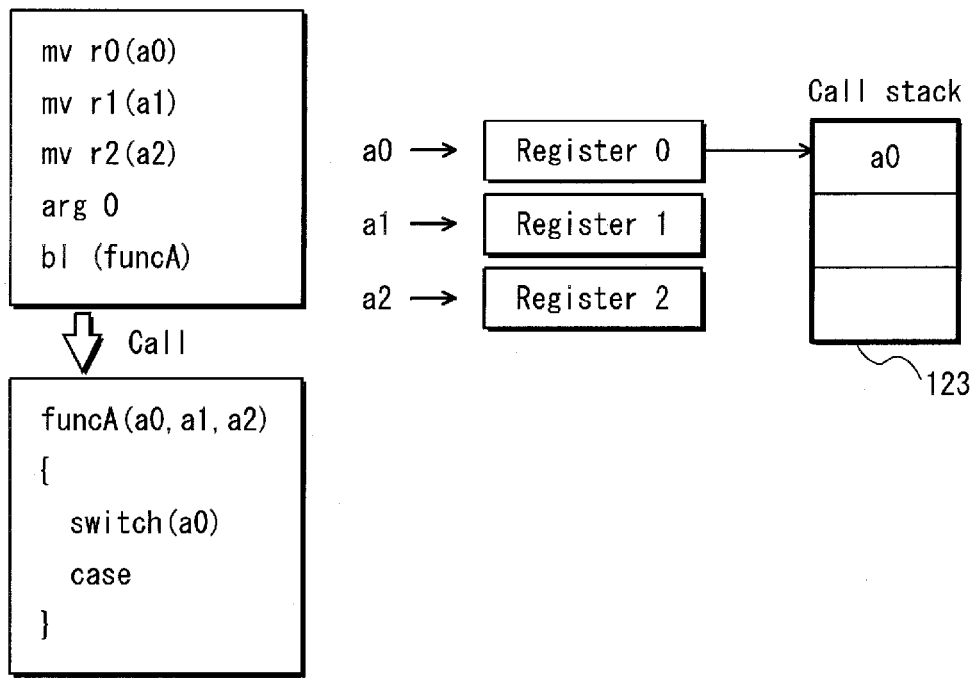
FIGS. 12A and 12B show a specific example of argument passing to the call stack in the information processing device 300 pertaining to a variation of the Embodiment.
Figure 12B:
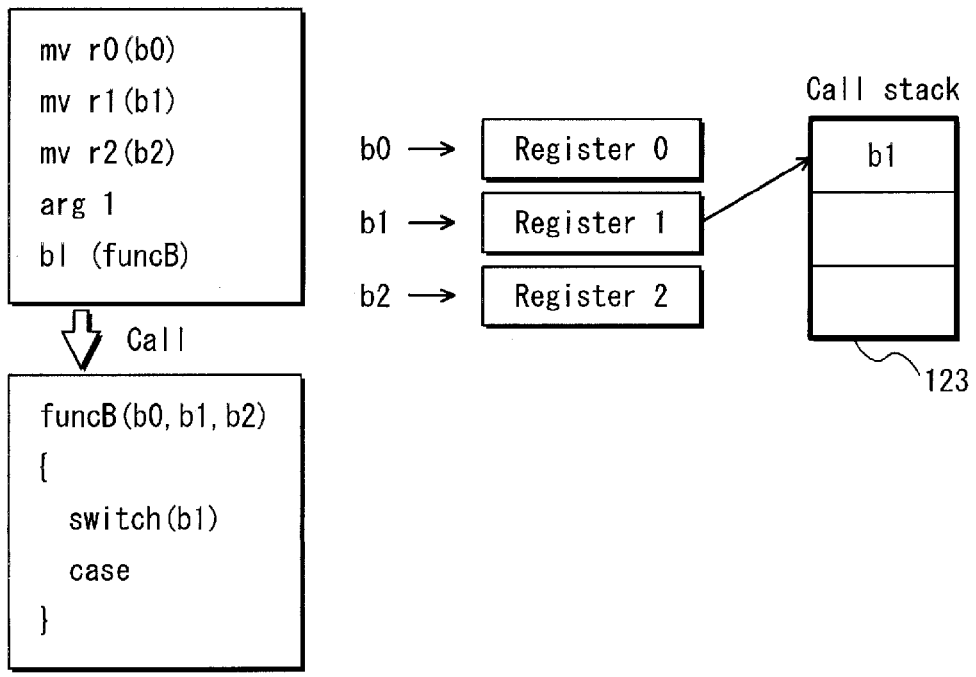

FIGS. 12A and 12B show examples in which an argument of a function has been stored in the call stack 123. FIGS. 12A and 12B show the procedures by which an argument of a function is obtained using the argument number notification unit 121. In FIG. 12A, the argument influencing the switch/case statements, which are branch statements, is "a0". The instruction "arg" shown in FIG. 12A is a notification of this branch-influencing argument. The operand "0" of the instruction "arg" in FIG. 12A indicates the register number within the group of registers 120 that stores therein the branch-influencing argument. Consequently, in FIG. 12A, the call stack 123 pushes the value in register 0 as indicated by the instruction "arg".

In FIG. 12B, the branch-influencing argument is "b1". The operand of the instruction "arg" in FIG. 12B is "1". Accordingly, register 1 is known to be the register out of the group of registers 120 that influences branching. The call stack 123 pushes the value in register 1 as indicated by the instruction "arg" at function call time.

In order to realize such a structure, the compiler 119 must generate the "arg" instruction at compile time. In the above-described Embodiment, the compiler 119 generates code that indicates which argument is to be stored in register 0 (indicating as much with the "mv" instruction). In contrast, in the present variation, code is generated that indicates a register with a value that is to be pushed onto the call stack.

(Summary)

As shown in the above-described Embodiment and Variation, the information processing device 100 comprises a call stack that obtains an argument when a function call is performed. Also, at the point when a branch instruction is executed, a branch destination is predicted by taking the leading value stored in the call stack and the address of the executed branch instruction to search past branch results. Furthermore, when a branch instruction is actually executed, a branch result entry is recorded showing the branch instruction address, the call stack leading value at that time, and the branch destination, in correspondence. Thus, branch destination prediction for subsequent branch instructions can be made more reliable. Through the call stack that obtains arguments of a function call in this way, branch prediction can be accomplished for indirect branching without the use of implicit operation instructions that indicate key branch prediction information, as is done in conventional technology. In brief, for any given program, the branch destination of any branch instruction within that program can be predicted.

(Supplement)

In the above Embodiment, an embodiment method of the present invention was described, but the Embodiment is of course not limited as such. Multiple variations of the above Embodiment are included in the present invention and are explained below.

1) In the above Embodiment, the function call notification unit 111 detects compilation of instructions executed by the instruction execution unit 110 using a specific instruction by the compiler 119, and when such a function call is executed, makes a notification to such effect. However, function call detection is not limited to this method. Instead, the instruction actually executed may be analyzed and detection be made to consist of finding an instruction that matches a specific predetermined instruction statement. Alternatively, the compiler 119 may generate an instruction reserved for function call notification and output that instruction to the function call notification unit 111, which may thus detect the execution of a function call.

Similarly, in the above Embodiment, the function return notification unit 112 detects the execution of a specific instruction by the compiler 119. Yet rather than detect the execution of a function return, the above method may be used. For example, function return may be detected by using a function return execution notification received from the compiler.

2) The above Embodiment describes a method by which the branch prediction unit 117 makes predictions using the leading value of the call stack 113. If, however, at branch instruction execution time, the function within which the branch instruction is to be executed, and the argument corresponding to such a function, is known by correspondence, then the structure may reference the required argument rather than the leading value of the call stack 113. That is, when obtaining an argument, the call stack 113 may store information indicating the called function in correspondence with that argument. Thus, upon being notified of the execution of a branch instruction, the branch prediction unit 117 may receive the information indicating the function that includes the branch instruction and obtain the argument corresponding to the function indicated by that function information from the call stack 113.

3) In the above Embodiment, no explanation was provided detailing a case in which the branch prediction unit 117 finds a plurality of branch result entries matching the branch instruction address and the leading value of the call stack 113. Such an explanation is provided below.

In addition to the above-described elements, branch result entries may also show information concerning the frequency at which a branch has been reached, in correspondence. That is, each branch result entry may additionally show a branch count value, in correspondence. This branch count value is incremented by one whenever the branch destination indicated by the branch result entry is actually branched to by the branch instruction indicated by the branch result entry and decremented by one otherwise.

Then, should the branch prediction unit 117 find a plurality of branch result entries as search results, the branch destination of the branch result entry with the greatest branch count value may be the branch destination of the executed branch instruction, and the instruction fetch unit 118 notified to such effect.

Branch prediction accuracy can be improved accordingly.

Considering that the above-described branch count value is intended to indicate the reliability with which a branch result entry is taken, the structure may omit to decrement the branch count value when a given branch is not reached.

Also, the increment value may be a predetermined value other than one.

4) In the above Embodiment, a specific example is given in which a single argument influences branching. However, there are also cases in which a plurality of arguments has such an influence.

An example of the operation of the information processing device 300 is described below with reference to FIGS. 13A and 13B.

Figure 13A:
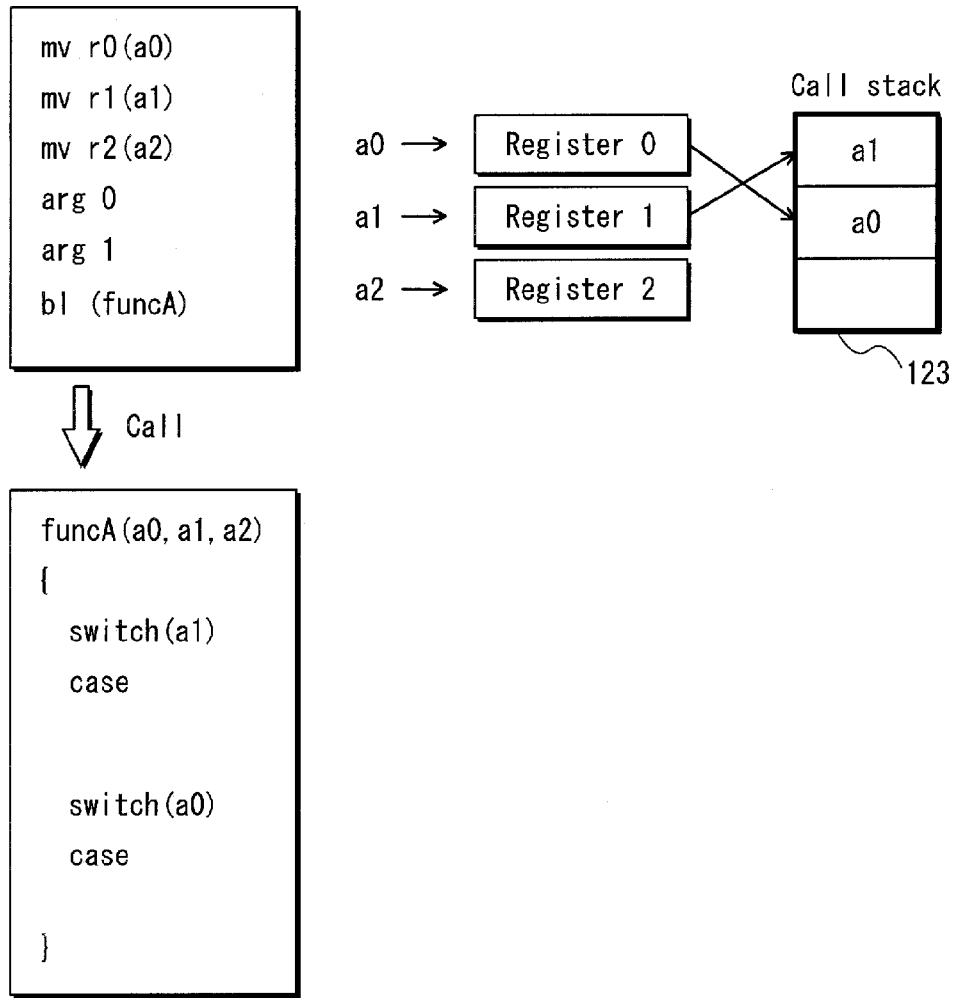
FIGS. 13A and 13B show another specific example of argument passing to the call stack in the information processing device 300 pertaining to a variation of the Embodiment.
Figure 13B:
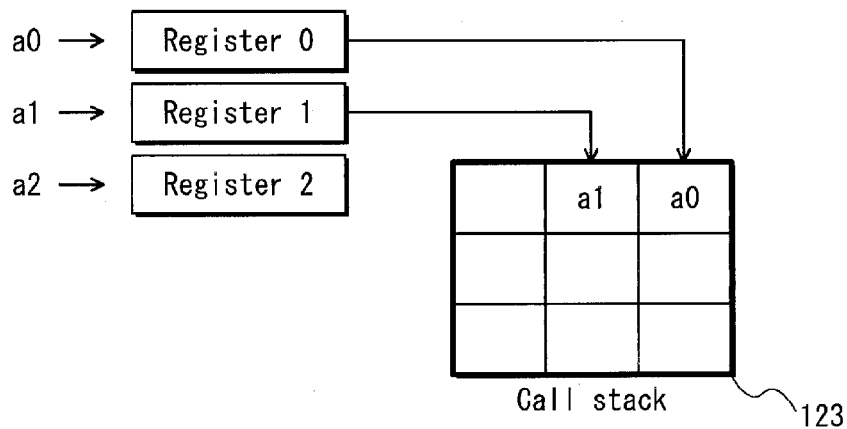

FIGS. 13A and 13B show an example in which multiple arguments influence branching through the order in which the arguments are to be pushed onto the stack by use of the instruction "arg".

As shown by the "switch" statements in FIG. 13A, each of the two arguments "a1" and "a0" influences branching. For this reason, as shown by the sequence of processor instructions "arg", the arguments "a0" and "a1" from the high-level language program function call time argument sequence "(a0, a1, a2)" are compiled as a sequence of instructions in reverse order.

Next, the call stack 123 pushes the arguments in that order. That is, "a0" is pushed first, then "a1" is pushed onto the call stack 123. Thus, at branch instruction execution time, the arguments relating to each branch instruction may be used as key information for branch prediction. It should be noted that branch prediction and the storing of branch result entries in the branch result buffer are both performed using arguments that are popped from the call stack.

It should be noted that the structure shown in FIG. 13A may also be realized as shown in FIG. 13B. In short, FIG. 13B shows a structure in which the call stack 123 is able to take a plurality of arguments. FIG. 13B shows an example in which the call stack 123 is able to take a plurality of arguments in a single step. At branch prediction time, the branch prediction unit 117 sequentially uses the values that were stored at once in the call stack 123.

The register is assigned by using code generated by the compiler 119 which indicates the number of the register in which the arguments should be stored, as explained in the above Embodiment and Variation.

5) In the above Embodiment, an example of indirect branching is shown. Yet, prediction of the condition execution time for a branch instruction with a fixed destination is also possible.

Figure 14:
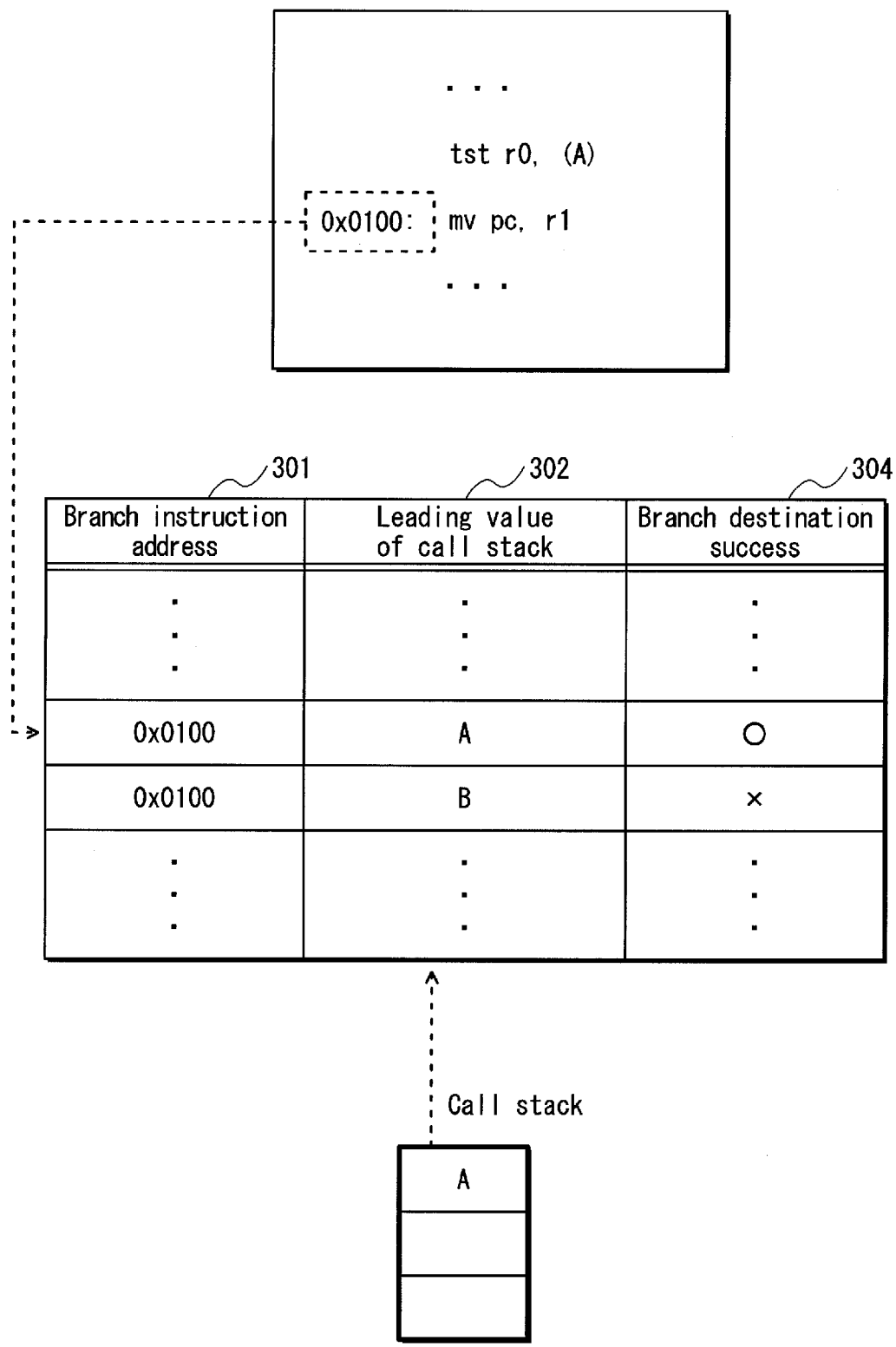
FIG. 14 shows a schematic diagram of searching by the branch prediction unit when the program shown in FIG. 8 executes a branch instruction.

FIG. 14 shows an example of a record in the branch result buffer 116 for which the branch destination is fixed. In the example program for FIG. 14, the "tst" instruction tests whether the value in register r0 is equal to "a" and the execution of the conditional branch instruction "bleq" is determined accordingly. When the instruction "bleq" is executed, branching occurs to the address shown in r1.

The branch result information that is stored in the branch result buffer 116 consists of the branch instruction address 301, the leading value 302 of the call stack 113, and information indicating whether or not branching occurred, in correspondence.

When executing a conditional branch instruction, the branch prediction unit 117 searches the branch result buffer 116 for a branch result entry that matches the address of the conditional branch instruction and the leading value of the call stack 113 at that time. If such a branch result entry is found, then if there is a branch 304 to which that entry is indicated as having branched, the instruction fetch unit 118 is notified of that fixed branch destination address. If branching did not occur, the instruction fetch unit 118 is notified of the address of the next conditional branch instruction.

According to this structure, branch prediction is possible not only for indirect branching but also for conditional branching.

6) In the above Embodiment, a structure was shown in which the instruction execution unit 110 comprises a group of registers 120 for storing arguments.

Here, a structure is explained in which the instruction execution unit 110 uses a structure other than the group of registers 120. That is, an example in which the instruction execution unit 110 stores arguments in the storage device 200 is explained using FIG. 15.

In this case, the instruction execution unit 110 comprises a stack pointer register 1501 that shows where an argument is stored. Subsequently, the storage device 200 stores function arguments in a stack 1502 indicated by the stack pointer register 1501. When notified of a function call by the function call notification unit 111, the call stack 113 obtains the value of the stack pointer register 1501 from the instruction execution unit 110 and stores the obtained argument in the stack 1502 as the value indicated by the stack pointer register 1501 of the storage device 200.

With such a structure, the call stack 113 is still able to obtain arguments associated with branch instructions at function call time.

Figure 15:
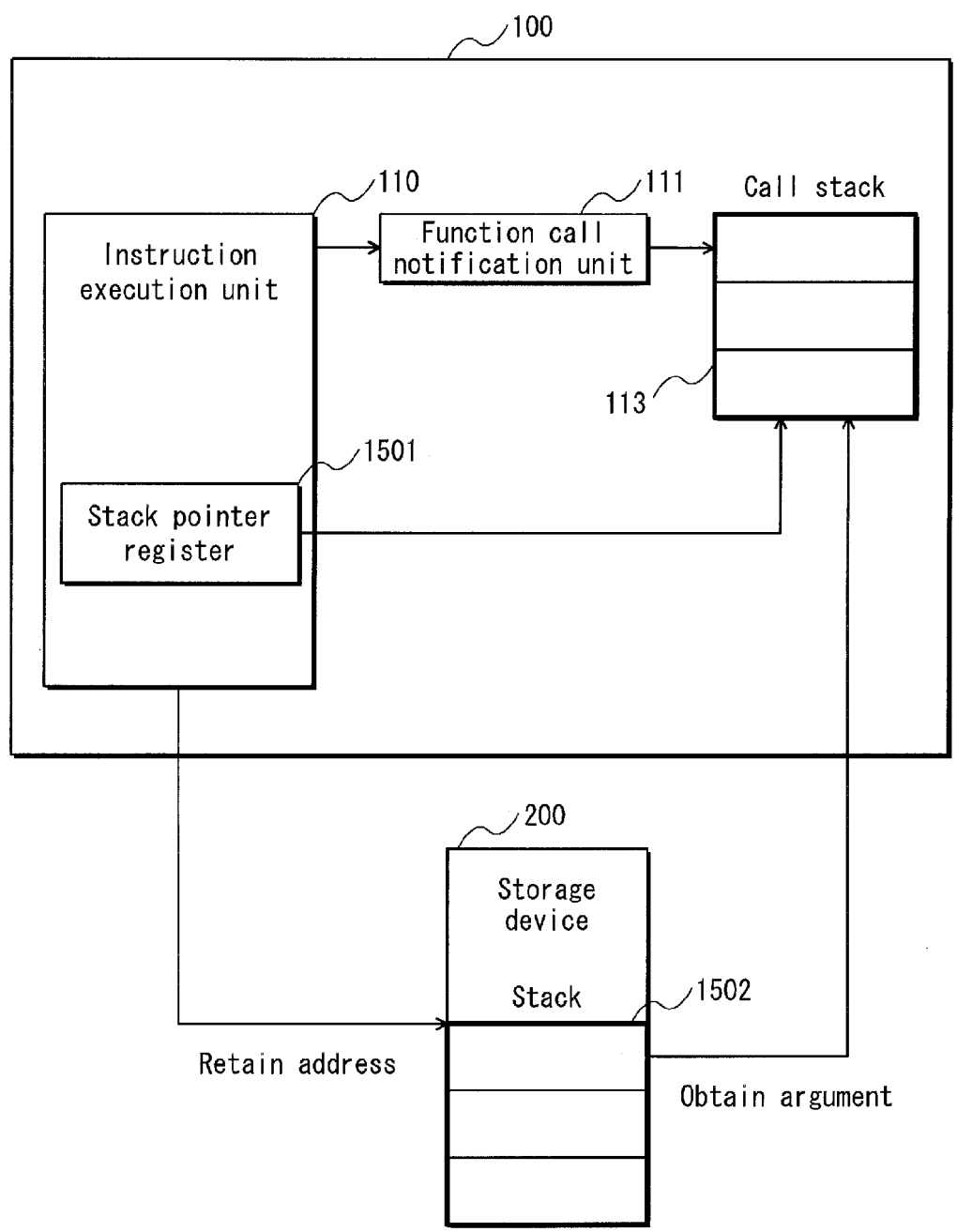
FIG. 15 shows another example of argument passing to the call stack.
Figure 16A:
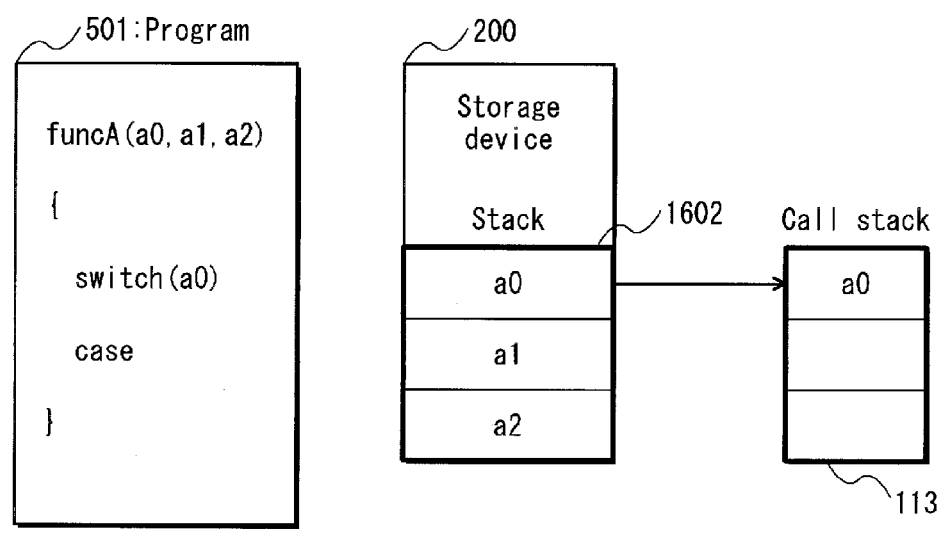
FIGS. 16A and 16B show a specific example of argument passing to the call stack shown in FIG. 15.
Figure 16B:
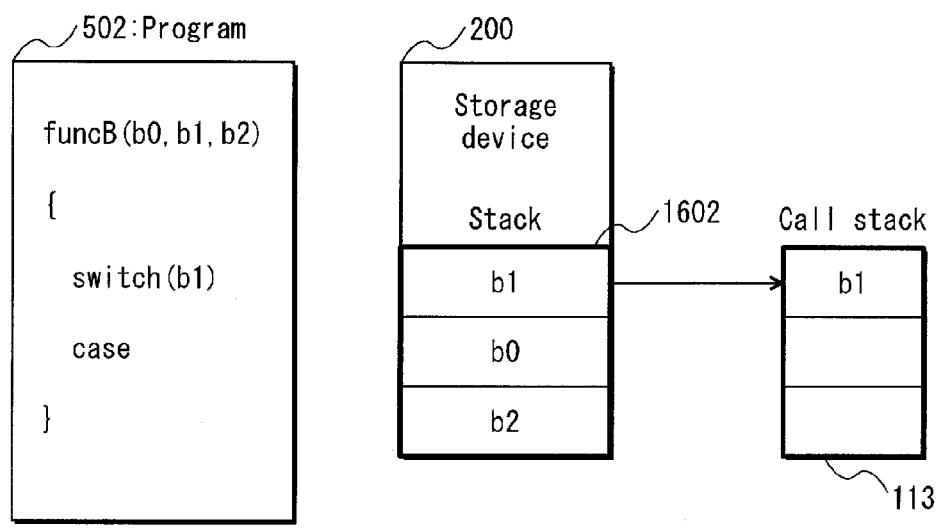

A specific example of the argument obtaining process performed using the method shown in FIG. 15 is shown in FIGS. 16A and 16B.

As shown in FIG. 16A, when "funcA" is called within the program 501, the arguments "a0", "a1", and "a2" are stored in the stack 1602 so that "a0" becomes the leading value. At this point, the leading address from the stack 1602 is stored in the stack pointer register 1501.

Next, when the branch instruction (the "switch" statement in FIG. 16A) is executed, the call stack 113 stores "a0", which is the leading value of the stack 1602 at the address indicated by the stack pointer register 1501.

Also, as shown in FIG. 16B, when "funcB" is called within the program 502, the arguments "b0", "b1", and "b2" are stored in the stack 1602 so that the branch instruction-associated "b1" becomes the leading value. At this point, the leading address from the stack 1602 is stored in the stack pointer register 1501.

Next, when the branch instruction (the "switch" statement in FIG. 16B) is executed, the call stack 113 stores "b1", which is the leading value of the stack 1602 at the address indicated by the stack pointer register 1501.

7) In the above Embodiment, a structure is described in which only the value stored in register 0 is stored in the call stack 113.

Here, another embodiment is described that is still included in the concept of the present invention.

FIG. 17A shows an example in which the call stack 113 has a larger capacity and stores not only the argument in register 0 but all of the arguments of the function received at function call time.

Also, while the case here described is one in which all arguments are passed to the call stack, not all of the arguments of the function must necessarily be passed. A structure in which a plurality of arguments out of all arguments is stored is also possible. For the example of FIG. 17A, a structure is also possible in which argument "a0", argument "a1", and argument "a2" are stored in the call stack. In such a case, the structure should be such that the three variables are stored in, for instance, register 0 through register 2.

Accordingly, the reliability of branch prediction can be improved in comparison to branch predictions made using a single argument only.

Also, as shown in FIG. 17B, the call stack 113 may be used not only to store the argument in register 0, but may also be used as a return stack. In other words, a processor that makes use of a return stack performs pushing and popping of a return address simultaneously with the call stack, and so the return addresses may be combined with the arguments in the same stack. It should be noted that in FIG. 17B, "addressA", "addressB", and "addressC" respectively indicate the return address for "funcA", "funcB", and "funcC". Concurrent use as a return stack is thus made possible.

8) In the above Embodiment, a call stack is used to hold function arguments, but the call stack need not necessarily be a stack per se; any data structure may be used if useable to therein the information indicated by the call stack in the above Embodiment.

9) The information processing device 100 of FIG. 1 and the information processing device 300 of FIG. 11, as well as all functional units thereof, may be realized by integration in one or several LSIs (Large Scale Integration). Also, a plurality of functional units may be realized in a single LSI.

According to varying integrations, an LSI may be called an IC (Integrated Circuit), a system LSI, a VLSI (Very Large Scale Integration), a SLSI (Super Large Scale Integration), an ULSI (Ultra Large Scale Integration), or similar.

Additionally, the integrated circuit method is not limited to LSI, but may also be realized as a private circuit or as a general-use processor. After LSI manufacture, a FPGA (Field Programmable Gate Array) or a reconfigurable processor connected or set up in circuit cells within the LSI may also be used.

Furthermore, should integrated circuit technology appear that comes to replace LSI, perhaps through progress in semiconductors or in related technologies, the integration of function blocks using such technology is of course also possible. Potential applicability to biotechnology is also conceivable.

10) A control program of program code pertaining to the operation of branch prediction shown in the above Embodiment, executed on the processor of the information processing device that processes branch predictions (see FIG. 6), and all circuits connected to that processor may be recorded on a recording medium or be distributed and made available via any type of communications channel (for example, electronic communication circuits, wireless or wired communication circuits, or a network such as the Internet). The recording medium may be an IC card, a hard disk, an optical disc, a floppy disc, ROM, or the like. The control program so distributed and made available is used by storage in processor read-accessible memory so that the execution of the control program by that processor also realizes each of the functions described in the Embodiment.

11) The Embodiment of the branch prediction device pertaining to the present invention is described below with an explanation of the advantageous effects thereof.

The branch prediction device of the present invention comprises an instruction execution unit operable to execute instructions, a function call notification unit operable to make a notification of execution of a function call instruction by the instruction execution unit, a call stack that stores therein at least one argument of the function call notification when notified by the function call notification unit of the execution of the function call instruction, a branch instruction notification unit operable to make a notification of execution of a branch instruction by the instruction execution unit, the branch instruction being included in the function that is called by the function call instruction, a branch result buffer that stores therein branch result entries each showing the following (i), (ii), and (iii) in correspondence: (i) a branch instruction address; (ii) a leading value of the call stack at branch instruction execution time; and (iii) a branch result indicating the address of the branch destination, a branch prediction unit operable to (i) when notified by the branch instruction notification unit of the execution of the branch instruction, search the branch result buffer for any branch result entry therein that matches a branch instruction address of the executed branch instruction and an argument stored in the call stack when the branch instruction is executed, and (ii) if a branch result entry that matches is found, regard a branch result of the branch result entry that matches as a predicted result of branching by the branch instruction, an instruction fetch unit operable to fetch instructions in accordance with the predicted result predicted by the branch prediction unit, and a branch result record unit operable to, after the execution of the branch instruction is complete, record in the branch result buffer one branch result entry showing the following (i), (ii), and (iii) in correspondence: (i) the branch instruction address of the executed branch instruction; (ii) a branch result indicating an address of a branch destination that has been branched to via the execution of the branch instruction; and (iii) a leading value of the call stack at execution time of the branch instruction.

Further, the branch prediction method of the present invention used by an information processing device for predicting a branch destination for a branch instruction included in a function, comprises the steps of: (a) making a notification of execution of a function call instruction, (b) storing in a call stack at least one argument of the function call instruction when notified of the execution of the function call instruction during step (a), (c) making a notification of execution of a branch instruction included in the function that is called by the function call instruction, (d) when notified of the execution of the branch instruction during step (c), (i) searching a branch result storage medium that is connected to the information processing device and that stores therein branch result entries each showing the following (I), (II), and (III) in correspondence: (I) a branch instruction address; (II) a leading value of the call stack at branch instruction execution time; and (III) a branch result indicating an address of a branch destination, for any branch result entry therein that matches a branch instruction address of the executed branch instruction and an argument stored in the call stack when the branch instruction is executed; and (ii) if a branch result entry that matches is found, regarding a branch result of the branch result entry that matches as a predicted result of branching by the branch instruction, (e) fetching instructions in accordance with the predicted result predicted in step (d), and (f) after the execution of the branch instruction is complete, and recording in the branch result storage medium one branch result entry showing the following (i), (ii), and (iii) in correspondence: (i) the branch result indicating the branch instruction address of the executed branch instruction; (ii) an address of a branch destination that has been branched to via the execution of the branch instruction; and (iii) a leading value of the call stack at execution time of the branch instruction.

Further, the branch prediction program recording medium of the present invention that is computer-readable, on which has been recorded a branch prediction program in order for a computer to execute branch prediction processing for predicting a branch destination for branch instructions for program execution, comprises the steps of (a) making a notification of execution of a function call instruction, (b) storing in a call stack at least one argument of the function call instruction when notified of the execution of the function call instruction during step (a), (c) making a notification of execution of a branch instruction included in the function that is called by the function call instruction, (d) when notified of the execution of the branch instruction during step (c), (i) searching a branch result storage medium that is connected to the computer and that stores therein branch result entries each showing the following (I), (II), and (III) in correspondence: (I) a branch instruction address; (II) a leading value of the call stack at branch instruction execution time; and (III) a branch result indicating an address of a branch destination, for any branch result entry therein that matches a branch instruction address of the executed branch instruction and an argument stored in the call stack when the branch instruction is executed; and (ii) if a branch result entry that matches is found, regarding a branch result of the branch result entry that matches as a predicted result of branching by the branch instruction, and (e) fetching instructions in accordance with the predicted result predicted in step (d), after the execution of the branch instruction is complete, recording in the branch result storage medium one branch result entry showing the following (i), (ii), and (iii) in correspondence: (i) the branch instruction address of the executed branch instruction; (ii) a branch result indicating an address of a branch destination that has been branched to via the execution of the branch instruction; and (iii) a leading value of the call stack at execution time of the branch instruction.

The call stack comprises a structure for obtaining arguments of a function at function execution time, the branch result buffer stores therein those arguments and past branch results in correspondence, and, when a branch instruction is actually executed, the branch prediction unit searches the branch result buffer for a past branch result based on the branch instruction address and the leading value of the call stack so that if there is a hit, the branch prediction unit is able to regard a branch result of the branch result entry that matches as a predicted result of branching by the branch instruction.

Additionally, when a branch instruction is actually executed, the branch result record unit records in the branch result buffer one branch result entry showing the following (i), (ii), and (iii) in correspondence: (i) the branch instruction address of the executed branch instruction; (ii) a branch result indicating the address of a branch destination that has been branched to via the execution of the branch instruction; and (iii) a leading value of the call stack at execution time of the branch instruction, and thus the reliability of the branch prediction can be ameliorated as branch instructions are executed.

The branch prediction device further comprises a function return notification unit operable to make a notification of execution of a function return instruction by the instruction execution unit, wherein the call stack is cleared of any arguments of a function corresponding to the function return instruction when notified by the function return notification unit of the execution of the function return instruction.

Accordingly, when a function is returned, the call stack is cleared of the arguments stored within, and so the leading value of the call stack can be made to always be an argument of the function currently being executed, which allows the branch prediction device to unerringly use this argument of a function that includes a branch instruction as information for branch prediction Furthermore, when the branch instruction is a conditional branch instruction the branch result entry recorded by the branch result record unit further shows, in correspondence, information indicating whether or not the conditional branch instruction has been executed.

Accordingly, when the branch instruction is a conditional branch instruction, information in correspondence with the success of conditional branching, perhaps based on the success and failure thereof, may be used to judge whether or not conditional branching will come into effect and thus realize branch prediction.

Additionally, the branch result entry recorded in the branch result buffer by the branch result record unit may further show, in correspondence, frequency information indicating a frequency at which the branch destination of the branch instruction has been reached, and when, in searching, a plurality of branch result entries that match are found, the branch prediction unit may regard the branch destination of one of the branch result entries with the greatest branch frequency as the predicted result of the branching by the branch instruction.

Additionally, the branch result record unit, when the branch instruction is executed, may increment by one frequency information for a branch result entry that matches the branch destination address of the branch instruction and the leading value of the call stack at the execution time of the branch instruction and that also shows the branch destination actually branched to at the execution time of the branch instruction, and may decrement by one frequency information for any other branch result entry that matches the branch destination address of the branch instruction and the leading value of the call stack at the execution time of the branch instruction but that shows a different branch destination than the branch destination actually branched to at the execution time of the branch instruction.

Accordingly, each branch result entry has corresponding information for specifying the frequency at which that branch result entry was executed, and should multiple branch result entries be found that match branch destination address of the branch instruction and the leading value of the call stack at the execution time of the branch instruction, the branch result entry with the highest execution frequency may be regarded among these as the predicted branch destination. Thus, the reliability of branch prediction may be improved.

Additionally, the instruction execution unit may include a plurality of registers for storing arguments therein, and the call stack may obtain and store therein a value stored in one predetermined specific register among the plurality of registers.

Accordingly, a value stored in a predetermined register within the instruction execution unit can be passed to the call stack as an argument, consequently simplifying device manufacture.

Additionally, compiler of the present invention converts source code indicating a function that includes a branch instruction into an instruction code sequence in a format executable by a computer, wherein the computer includes a call stack which stores therein arguments of the function as information for predicting a branch destination of the branch instruction, and the compiler generates instruction code for storing in the call stack at least one argument relating to the branch instruction out of all arguments of the function that includes the branch instruction when a call for the function is executed.

Additionally, a compile method of the present invention for converting source code indicating a function includes a branch instruction into an instruction code sequence in a format executable by a computer, wherein the computer may include a call stack which stores therein arguments of the function as information for predicting a branch destination of the branch instruction, and the compile method may include a step of generating code for storing in the call stack at least one argument relating to the branch instruction out of all arguments of the function that includes the branch instruction when a call for the function is executed.

Accordingly, given that the computer can control the arguments passed to the call stack so that these are always stored in a specific register at function call time, reliable storage in the call stack of the argument that determines the branch destination of a branch instruction within the function can be guaranteed.

[Industrial Applicability]

The branch prediction device pertaining to the present invention can be used to confer more effective execution capability to a program and to promote improved processing speed in a processor. Accordingly, the invention has applicability in the wide range of fields in which processors are used. For example, not only large-scale calculating machines and personal computers but also all types of household appliances, cellular telephones, and similar communication equipment, industrial equipment, control equipment and so on may benefit from use thereof.

REFERENCE SIGNS LIST

100, 300 information processing device
110, 122 instruction execution unit
111 function call notification unit
112 function return notification unit
113, 123 call stack
114 branch instruction notification unit
115 branch result record unit
116 branch result buffer
117 branch prediction unit
118 instruction fetch unit
120 group of registers
121 argument number notification unit
200 storage device
1000, 1100 branch prediction device

The invention claimed is:

1. A branch prediction device, comprising:
an instruction execution unit operable to execute instructions;
a function call notification unit operable to make a notification of execution of a function call instruction by the instruction execution unit;
a call stack that stores therein at least one argument of a function that is called by the function call instruction when notified by the function call notification unit of the execution of the function call instruction;
a branch instruction notification unit operable to make a notification of execution of a branch instruction by the instruction execution unit, the branch instruction being included in the function that is called by the function call instruction;
a branch result buffer that stores therein branch result entries each showing the following (i), (ii), and (iii) in correspondence: (i) a branch instruction address; (ii) a leading value of the call stack at branch instruction execution time; and (iii) a branch destination;

a branch prediction unit operable to (i) when notified by the branch instruction notification unit of the execution of the branch instruction, search the branch result buffer for any branch result entry therein that matches a branch instruction address of the executed branch instruction and an argument stored at a top of the call stack when the branch instruction is executed, and (ii) if a branch result entry that matches is found, regard a branch result of the branch result entry that matches as a predicted result of branching by the branch instruction;

an instruction fetch unit operable to fetch instructions in accordance with the predicted result predicted by the branch prediction unit;

a branch result record unit operable to, after the execution of the branch instruction is complete, record in the branch result buffer one branch result entry showing the following (i), (ii), and (iii) in correspondence: (i) the branch instruction address of the executed branch instruction; (ii) an address of a branch destination that has been branched to via the execution of the branch instruction; and (iii) a leading value of the call stack at execution time of the branch instruction; and a function return notification unit operable to make a notification of execution of a function return instruction by the instruction execution unit, wherein the call stack is cleared of any arguments of a function corresponding to the function return instruction when notified by the function return notification unit of the execution of the function return instruction.

2. The branch prediction device of claim 1, wherein
the branch instruction is a conditional branch instruction having a fixed branch destination, and
when the branch instruction is a conditional branch instruction having a fixed branch destination, the branch result entry recorded by the branch result record unit shows, in correspondence, information indicating whether or not branching has occurred as a result of the conditional branch instruction being executed, instead of the address of the branch destination.

3. The branch prediction device of claim 1, wherein
the branch result entry recorded in the branch result buffer by the branch result record unit further shows, in correspondence, count information indicating a branch count denoting a number of times the branch destination of the branch instruction has been reached, and
when, in searching, a plurality of branch result entries that match are found, the branch prediction unit regards the branch destination of one of the branch result entries with count information indicating a greatest branch count as the predicted result of the branching by the branch instruction.

4. The branch prediction device of claim 3, wherein the branch result record unit, when the branch instruction is executed, increments by one frequency information for a branch result entry that matches the branch instruction address of the branch instruction and the leading value of the call stack at the execution time of the branch instruction and that also shows the branch destination actually branched to at the execution time of the branch instruction, and decrements by one frequency information for any other branch result entry that matches the branch instruction address of the branch instruction and the leading value of the call stack at the execution time of the branch instruction but that shows a different branch destination than the branch destination actually branched to at the execution time of the branch instruction.

5. The branch prediction device of claim 1, wherein
the instruction execution unit includes a plurality of registers for storing arguments therein, and
the call stack obtains and stores therein a value stored in one predetermined specific register among the plurality of registers.

6. A branch prediction method used by an information processing device for predicting a branch destination for a branch instruction included in a function, comprising the steps of:

(a) making a notification of execution of a function call instruction;

(b) storing in a call stack at least one argument of a function that is called by the function call instruction when notified of the execution of the function call instruction during step (a);

(c) making a notification of execution of a branch instruction included in the function that is called by the function call instruction;

(d) when notified of the execution of the branch instruction during step (c), (i) searching a branch result storage medium that is connected to the information processing device and that stores therein branch result entries each showing the following (I), (II), and (III) in correspondence: (I) a branch instruction address; (II) a leading value of the call stack at branch instruction execution time; and (III) a branch destination, for any branch result entry therein that matches a branch instruction address of the executed branch instruction and an argument stored at the top of the call stack when the branch instruction is executed; and (ii) if a branch result entry that matches is found, regarding a branch result of the branch result entry that matches as a predicted result of branching by the branch instruction;

(e) fetching instructions in accordance with the predicted result predicted in step (d);

(f) after the execution of the branch instruction is complete, recording in the branch result storage medium one branch result entry showing the following (i), (ii), and (iii) in correspondence: (i) the branch instruction address of the executed branch instruction; (ii) an address of a branch destination that has been branched to via the execution of the branch instruction; and (iii) a leading value of the call stack at execution time of the branch instruction; and (g) making a notification of execution of a function return instruction, and (h) clearing the call stack of any arguments of a function corresponding to the function return instruction when notified of the execution of the function return instruction during step (g).

7. A non-transitory computer readable recording medium having stored thereon a compiler that converts source code indicating a function that includes a branch instruction into an instruction code sequence in a format executable by a computer, wherein the computer includes a call stack which stores therein arguments of the function as information for predicting a branch destination of the branch instruction, and from which the computer clears any arguments of a function corresponding to a function return instruction when notified of execution of the function return instruction, and the compiler judges whether or not the branch destination of the branch instruction is determined by a specific argument within the function at a function call time in the source code, and only in response to judging affirmatively, generates instruction code for storing in the call stack at least one argument relating to the branch instruction out of all arguments of the function that includes the branch instruction when a call for the function is executed.

8. A compile method for converting source code indicating a function that includes a branch instruction into an instruction code sequence in a format executable by a computer, the compile method being executed by a compiler device, wherein the computer includes a call stack which stores therein arguments of the function as information for predicting a branch destination of the branch instruction, and from which the computer clears any arguments of the function corresponding to a function return instruction when notified of execution of the function return instruction, and the compile method includes a step of judging whether or not the branch destination of the branch instruction is determined by a specific argument within the function at function call time in the source code, and only in response to judging affirmatively, generating code for storing in the call stack at least one argument relating to the branch instruction out of all arguments of the function that includes the branch instruction when a call for the function is executed.

9. A non-transitory computer readable recording medium having stored thereon a branch prediction program in order for a computer to execute branch prediction processing for predicting a branch destination for branch instructions for program execution, the branch prediction process comprising the steps of:

(a) making a notification of execution of a function call instruction;

(b) storing in a call stack at least one argument of a function that is called by the function call instruction when notified of the execution of the function call instruction during step (a);

(c) making a notification of execution of a branch instruction included in the function that is called by the function call instruction;

(d) when notified of the execution of the branch instruction during step (c), (i) searching a branch result storage medium that is connected to the computer and that stores therein branch result entries each showing the following (I), (II), and (III) in correspondence: (I) a branch instruction address; (II) a leading value of the call stack at branch instruction execution time; and (III) a branch destination, for any branch result entry therein that matches a branch instruction address of the executed branch instruction and an argument stored at the top of the call stack when the branch instruction is executed; and (ii) if a branch result entry that matches is found, regarding a branch result of the branch result entry that matches as a predicted result of branching by the branch instruction;

(e) fetching instructions in accordance with the predicted result predicted in step (d);

(f) after the execution of the branch instruction is complete, recording in the branch result storage medium one branch result entry showing the following (i), (ii), and (iii) in correspondence: (i) the branch instruction address of the executed branch instruction; (ii) an address of a branch destination that has been branched to via the execution of the branch instruction; and (iii) a leading value of the call stack at execution time of the branch instruction; and (g) making a notification of execution of a function return instruction, and (h) clearing the call stack of any arguments of a function corresponding to the function return instruction when notified of the execution of the function return instruction during step (g).

* * * * *